(12) United States Patent
Kim et al.

(10) Patent No.: US 10,558,835 B2
(45) Date of Patent: Feb. 11, 2020

(54) ELECTRONIC DEVICE AND METHOD FOR ACQUIRING FINGERPRINT INFORMATION

(71) Applicant: Samsung Electronics Co., Ltd., Suwon-si, Gyeonggi-do (KR)

(72) Inventors: Hyeonho Kim, Gumi-si (KR); Jinwook Kang, Gumi-si (KR); Sangmin Bae, Daegu (KR); Piljoo Yoon, Seongnam-si (KR); Haedong Lee, Daegu (KR); Yeunwook Lim, Daegu (KR); Yonggil Han, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 15/782,318

(22) Filed: Oct. 12, 2017

(65) Prior Publication Data

US 2018/0114047 A1 Apr. 26, 2018

(30) Foreign Application Priority Data

Oct. 21, 2016 (KR) ........................ 10-2016-0137845

(51) Int. Cl.
*G06K 9/00* (2006.01)
*G06F 3/041* (2006.01)
(Continued)

(52) U.S. Cl.
CPC ......... *G06K 9/0002* (2013.01); *G06F 3/0412* (2013.01); *G06F 3/0488* (2013.01);
(Continued)

(58) Field of Classification Search
CPC .. G06K 9/00; G06K 9/00221; G06K 9/00979; G06K 9/0002; G06K 9/00026;
(Continued)

(56) References Cited

U.S. PATENT DOCUMENTS

2010/0303311 A1 12/2010 Shin et al.
2011/0286640 A1 11/2011 Kwon et al.
(Continued)

FOREIGN PATENT DOCUMENTS

EP 3032385 A1 6/2016
EP 3057024 A1 8/2016
(Continued)

OTHER PUBLICATIONS

International Search Report dated Feb. 1, 2018 issued in International Application No. PCT/KR2017/011631.
(Continued)

*Primary Examiner* — Duy M Dang
(74) *Attorney, Agent, or Firm* — Jefferson IP Law, LLP

(57) ABSTRACT

An electronic device is provided. The electronic device includes a touch sensor, a fingerprint sensor, a display, and a processor. The display includes a display region having a fingerprint sensing region. The processor is configured to detect a touch input for the fingerprint sensing region by using the touch sensor, and to acquire touch information, corresponding to the touch input, on the display. In addition, the processor is configured to determine a graphic object for guiding acquisition of a user's fingerprint corresponding to the touch input through the fingerprint sensing region, based at least on the touch information. Also, the processor is configured to display the graphic object through the fingerprint sensing region of the display or proximity thereof.

20 Claims, 29 Drawing Sheets

(51) Int. Cl.
*G06F 3/0488* (2013.01)
*G06F 21/32* (2013.01)

(52) U.S. Cl.
CPC ......... *G06F 21/32* (2013.01); *G06K 9/00026* (2013.01); *G06K 9/00067* (2013.01); *G06K 9/00912* (2013.01); *G06F 2221/2117* (2013.01)

(58) Field of Classification Search
CPC ............ G06K 9/00067; G06K 9/00912; G06F 3/0412; G06F 3/0488; G06F 21/32
See application file for complete search history.

(56) References Cited

U.S. PATENT DOCUMENTS

| | | |
|---|---|---|
| 2014/0341446 A1 | 11/2014 | Hare et al. |
| 2015/0135108 A1 | 5/2015 | Pope et al. |
| 2015/0242696 A1 | 8/2015 | Kim et al. |
| 2016/0063298 A1 | 3/2016 | Tuneld et al. |
| 2016/0171281 A1 | 6/2016 | Park et al. |
| 2016/0239701 A1* | 8/2016 | Lee ......................... G06F 21/32 |
| 2016/0246396 A1 | 8/2016 | Dickinson et al. |

FOREIGN PATENT DOCUMENTS

| | | |
|---|---|---|
| KR | 10-2010-0112739 A | 10/2010 |
| KR | 10-2014-0046888 A | 4/2014 |
| KR | 10-2016-0071887 A | 6/2016 |
| WO | 2013/173838 A2 | 11/2013 |
| WO | 2016/036304 A1 | 3/2016 |
| WO | 2016/133602 A1 | 8/2016 |

OTHER PUBLICATIONS

European Search Report dated Feb. 13, 2018, issued in European Application No. 17196324.2-1218.

* cited by examiner

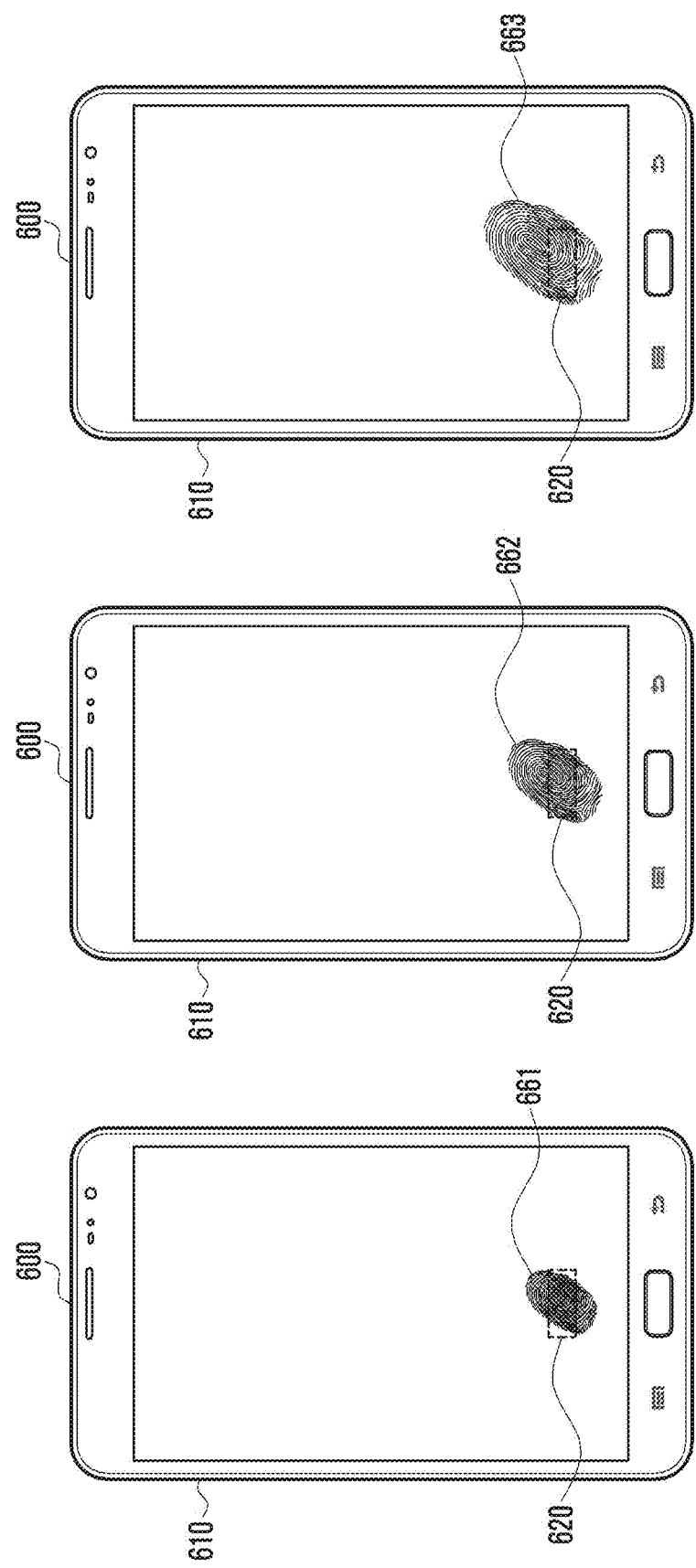

ELECTRONIC DEVICE AND METHOD FOR ACQUIRING FINGERPRINT INFORMATION

CROSS-REFERENCE TO RELATED APPLICATION(S)

This application claims the benefit under 35 U.S.C. § 119(a) of a Korean patent application filed on Oct. 21, 2016 in the Korean Intellectual Property Office and assigned Serial number 10-2016-0137845, the entire disclosure of which is hereby incorporated by reference.

TECHNICAL FIELD

The present disclosure relates to a technique for acquiring a fingerprint. More particularly, the present disclosure relates to an electronic device and method for acquiring fingerprint information by using a touch input.

BACKGROUND

With the mobile communication technologies and processor technologies dramatically evolved, electronic devices (e.g., mobile terminal devices) today may perform a variety of functions beyond a traditional call function. For example, various applications such as Internet browsers, games and calculators have been developed for and used in the electronic devices. As various functions have become available in the electronic devices, security for information stored in the electronic devices has become more important. In response to security needs, authentication techniques based on user's biometric information have been developed.

Authentication techniques based on biometric information may include processes of acquiring biometric information regarding, e.g., a fingerprint, an iris, a voice, a face, a blood vessel, etc. from a user and comparing the acquired biometric information with previously registered biometric information to determine whether the user is an authenticated user. In particular, fingerprint recognition technology is most commercially available for some reasons such as convenience, security, and economy. For user authentication using fingerprint recognition, the electronic device stores fingerprint information extracted from a user's fingerprint image in a memory thereof. Then, when any fingerprint image is newly input from a user who requests authentication, the electronic device compares fingerprint information extracted from the fingerprint image input with the stored (i.e., registered) fingerprint information. If the fingerprint input is identical with the stored fingerprint, the electronic device authenticates the user as a registered user.

If the size of a fingerprint sensor is smaller than the size of a user's actual fingerprint, the fingerprint sensor fails to scan the user's entire fingerprint region by one touch. If the electronic device acquires only a partial fingerprint in a fingerprint registration process, the rate of fingerprint recognition is inevitably lowered at the fingerprint authentication.

In other words, the quantity of fingerprint information acquired at a time by the fingerprint sensor is considerably small in view of the actual size of a user's fingerprint. Therefore, in order to acquire the entire fingerprint information from different positions for recognition, the fingerprint sensor requires several times of fingerprint inputs or the movement of a user's finger recognizes. However, it is not easy to accurately detect or predict unregistered regions of a fingerprint.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for displaying a guide to fingerprint acquisition using a touch input.

In accordance with an aspect of the present disclosure, an electronic device is provided. The electronic device includes a touch sensor, a fingerprint sensor, a display including a display region having a fingerprint sensing region, and a processor. The processor may be configured to detect a touch input for the fingerprint sensing region by using the touch sensor, to acquire touch information, corresponding to the touch input, on the display, to determine a graphic object for guiding acquisition of a user's fingerprint corresponding to the touch input through the fingerprint sensing region, based at least on the touch information, and to display the graphic object through the fingerprint sensing region of the display or proximity thereof.

In accordance with another aspect of the present disclosure, a method for acquiring a fingerprint at an electronic device having a touch sensor, a fingerprint sensor, a display including a display region having a fingerprint sensing region, and a processor is provided. The method, implemented by the processor, includes detecting a touch input for the fingerprint sensing region by using the touch sensor, acquiring touch information, corresponding to the touch input, on the display, determining a graphic object for guiding acquisition of a user's fingerprint corresponding to the touch input through the fingerprint sensing region, based at least on the touch information, and displaying the graphic object through the fingerprint sensing region of the display or proximity thereof.

In accordance with another aspect of the present disclosure, the electronic device and method is provided. The electronic device and method includes a guide function to easily acquire user's fingerprint information by using a fingerprint sensor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are diagrams illustrating examples of correcting a graphic object based on touch information according to various embodiments of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
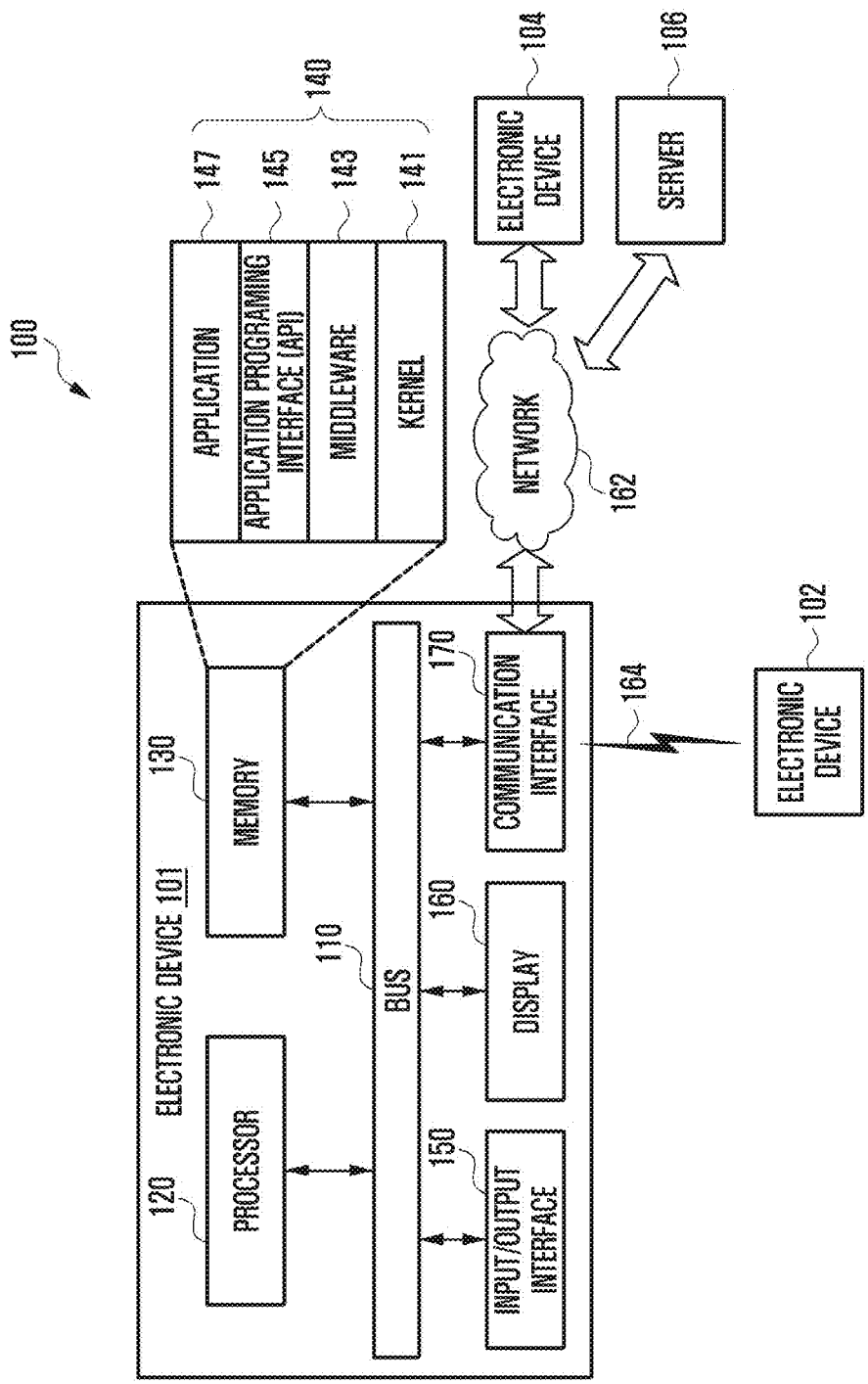
FIG. 1 is a block diagram illustrating an electronic device in a network environment according to various embodiments of the present disclosure.

FIG. 1 is a diagram illustrating an electronic device within a network environment according to various embodiments of the present disclosure.

Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, an AP, and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program module 140 may include a kernel 141, middleware 143, an application programming interface (API) 145, application programs (or applications) 147, etc. The kernel 141, the middleware 143 or at least part of the API 145 may be called an operating system (OS).

The kernel 141 is capable of controlling or managing system resources (e.g., the bus 110, the processor 120, the memory 130, etc.) used to execute operations or functions of other programs (e.g., the middleware 143, the API 145, and the application programs 147). The kernel 141 provides an interface capable of allowing the middleware 143, the API 145, and the application programs 147 to access and control/manage the individual components of the electronic device 101.

The middleware 143 may be an interface between the API 145 or the application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, the processor 120, the memory 130, etc.) to at least one of the application programs 147. For example, the middleware 143 processes one or more task requests according to a priority assigned to at least one application program, thereby performing scheduling or load balancing for the task requests.

The API 145 may be an interface that is configured to allow the application programs 147 to control functions provided by the kernel 141 or the middleware 143. The API 145 may include at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED) display, micro-electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device. For example, the communication interface 170 is capable of communicating with an external device connected to a network 162 via wired or wireless communication.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include at least one of wireless fidelity (Wi-Fi), Bluetooth (BT), near field communication (NFC), magnetic secure transmission (MST), and global navigation satellite system (GNSS). The GNSS may include at least one of GPS, global navigation satellite system (Glonass), Beidou NSS (Beidou), Galileo, the European global satellite-based navigation system, according to GNSS using areas, bandwidths, etc. In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of the following a telecommunications network, e.g., a computer network (e.g., local area network (LAN) or wide area network (WAN)), the Internet, and a telephone network.

A first external electronic device 102 and a second external electronic device 104 are each identical to or different from the electronic device 101, in terms of type. According to an embodiment, a server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from another electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
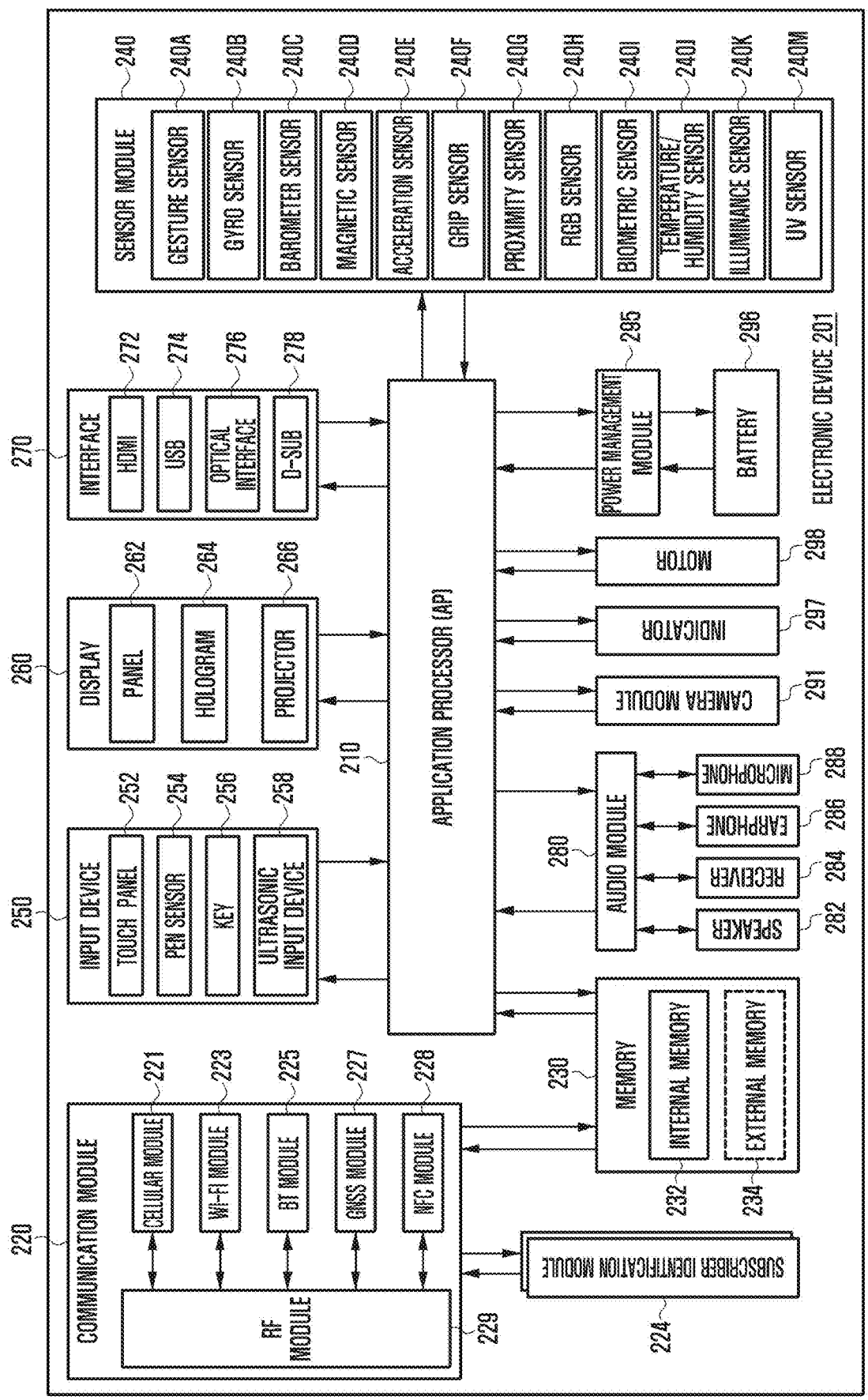
FIG. 2 is a block diagram illustrating an electronic device according to various embodiments of the present disclosure.

FIG. 2 is a block diagram illustrating an electronic device according to various embodiments of the present disclosure.

Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an OS or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor (ISP). The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication interface 170 is capable of including the cellular module 221, a Wi-Fi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, a short message service (SMS) service, an Internet service, etc., through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP.

The cellular module 221 is capable of providing a voice call, a video call, a short message service (SMS) service, an Internet service, etc., through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP.

The RF module 229 is capable of transmission/reception of communication signals, e.g., RF signals. The RF module 229 is capable of including a transceiver, a power amplifier module (PAM), a frequency filter, a low noise amplifier (LNA), an antenna, etc. At least one of the cellular module 221, the Wi-Fi module 223, the BT module 225, the GNSS module 227, and the NFC module 228 is capable of transmission/reception of RF signals through a separate RF module.

The memory 230 may include an internal memory 232 or an external memory 234. The internal memory 232 is capable of including at least one of a volatile memory, e.g., a dynamic random access memory (DRAM), a static RAM (SRAM), a synchronous dynamic RAM (SDRAM), etc. and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro SD (Micro-SD), a mini SD (Mini-SD), an extreme digital (xD), a multi-media card (MMC), a memory stick, etc. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input unit 258. The touch panel 252 may be implemented with at least one of a capacitive touch system, a resistive touch system, an IR touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display 260 may further include a control circuit for controlling the panel 262, the hologram unit 264, or the projector 266.

The interface 270 may include an HDMI 272, a USB 274, an optical interface 276, or a d-subminiature (D-sub) 278.

The interface 270 may be included in the communication interface 170 shown in FIG. 1. Additionally or alternatively, the interface 270 may include a mobile high-definition link (MHL) interface, a SD card/MMC interface, or an IR data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, etc.

The camera module 291 is a device capable of taking both still and moving images. The camera module 291 may include one or more image sensors (e.g., a front image sensor or a rear image sensor), a lens, an ISP, a flash (e.g., an LED or xenon lamp), etc.

The power management module 295 is capable of managing power of the electronic device 201. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296.

The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
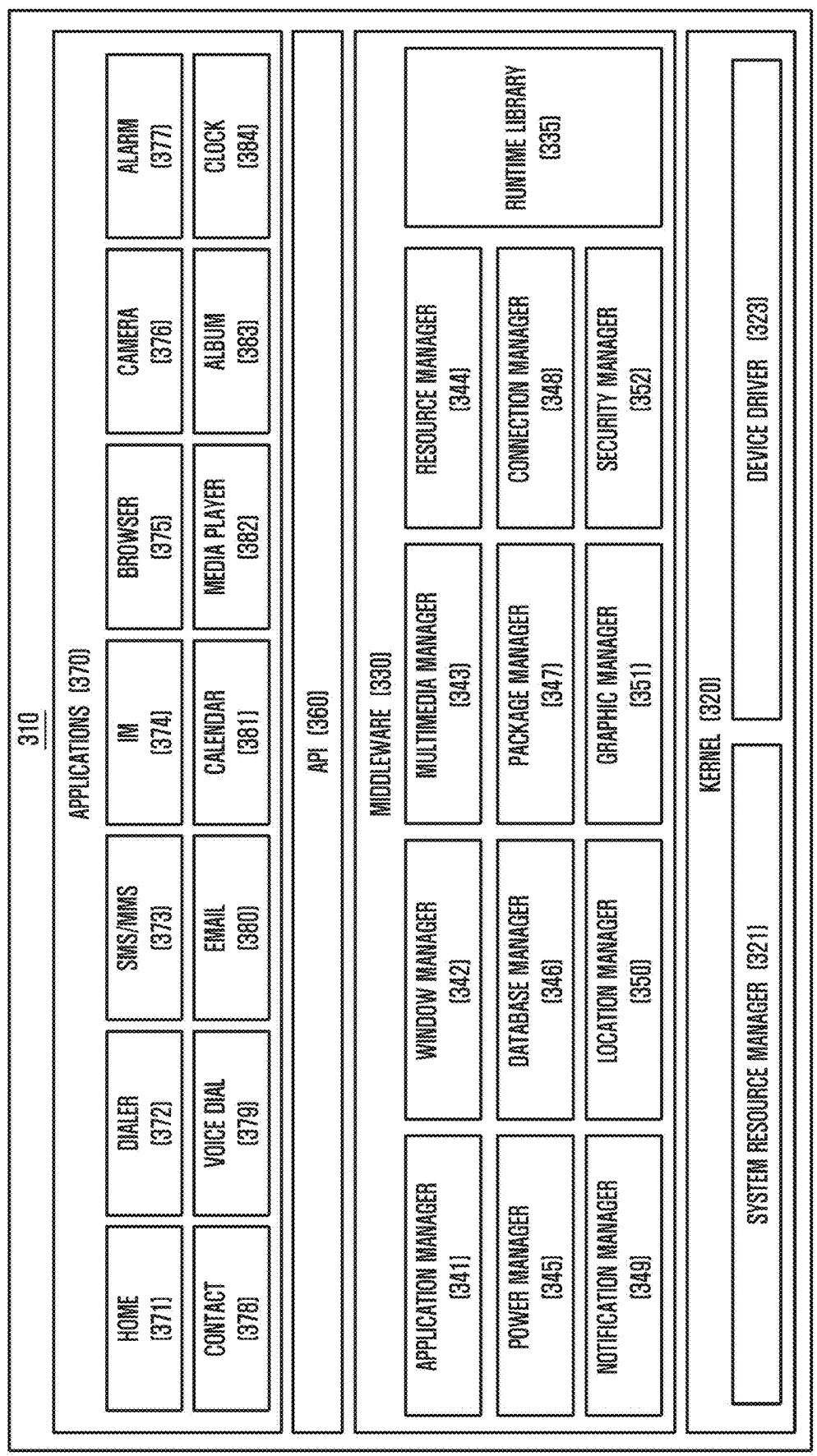
FIG. 3 is a block diagram illustrating a program module according to various embodiments of the present disclosure.

FIG. 3 is a block diagram illustrating a program module according to various embodiments of the present disclosure.

Referring to FIG. 3, a program module 310 (e.g., program module 140 shown in FIG. 1) is capable of including an OS for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc.

The program module 310 is capable of including a kernel 320, middleware 330, an API 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a Wi-Fi driver, and an audio driver. Further, according to an embodiment, the device driver 323 may include an inter-process communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. Furthermore, although not shown, the middleware 330 may also include a payment manager.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface (UI) related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an OS. For example, in Android or iOS, a single API set may be provided for each platform. In Tizen, two or more API sets may be provided.

The applications 370 (e.g., application programs 147) may include one or more applications for performing various functions, e.g., home 371, dialer 372, SMS/multi-media message service (MMS) 373, instant message (IM) 374, browser 375, camera 376, alarm 377, contact 378, voice dial 379, email 380, calendar 381, media player 382, album 383, and clock 384. Furthermore, although not shown, the applications 370 may also include health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

According to an embodiment, the applications 370 are capable of including an application (e.g., a health care application of a mobile medical device, etc.) having specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of OSs.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and programmable-logic device known or to be developed for certain operations.

According to various embodiments of the present disclosure, the devices (e.g. modules or their functions) or methods may be implemented by computer program instructions stored in a non-transitory computer-readable storage medium. In the case that the instructions are executed by at least one processor (e.g. processor 120), the at least one processor may execute the functions corresponding to the instructions. The non-transitory computer-readable storage medium may be the memory 130. At least a part of the programming module may be implemented (e.g. executed) by the processor 120. At least a part of the programming module may include modules, programs, routines, sets of instructions, and processes for executing the at least one function.

The non-transitory computer-readable storage medium includes magnetic media such as a floppy disk and a magnetic tape, optical media including a compact disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Figure 4A:
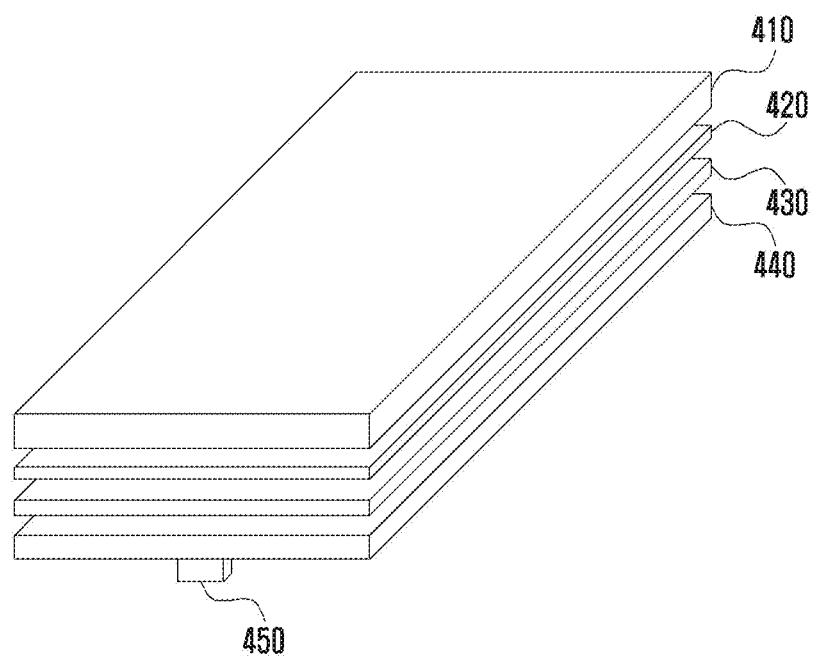
FIGS. 4A and 4B are diagrams schematically illustrating an electronic device having a fingerprint sensor according to various embodiments of the present disclosure.
Figure 4B:
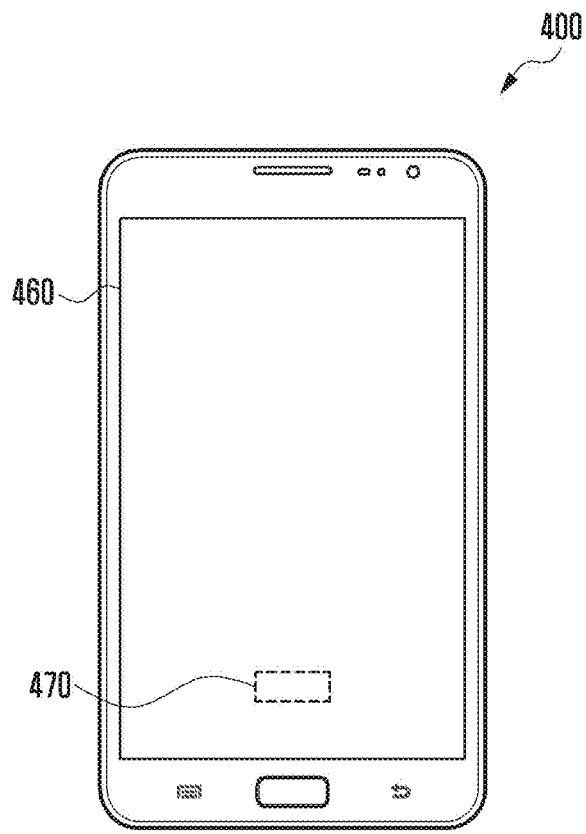

FIGS. 4A and 4B are diagrams schematically illustrating an electronic device having a fingerprint sensor according to various embodiments of the present disclosure.

FIG. 4A shows a layered structure of the electronic device having the fingerprint sensor.

Referring to FIG. 4A, the upward direction may indicate the front direction of the electronic device, and the downward direction may indicate the back direction of the electronic device. Each element of the electronic device may be contained in a housing of the electronic device.

A cover window 410 may be formed at the front side of the housing. The cover window 410 may be formed of a transparent material for transmission of light. The cover window 410 may protect a touch sensor 430 and a display 440 from external impacts.

The touch sensor 430 and the display 440 are disposed under the cover window 410. The cover window 410 and the touch sensor 430 (or the display 440) may be attached to each other through an optically clear adhesive (OCA) 420. Although FIG. 4A shows the touch sensor 430 disposed above the display 440, this is not to be construed as a limitation. Alternatively, both may be implemented in any other disposition such as on-cell or in-cell disposition. The touch sensor 430 detects a touch of an object (e.g., a user's finger or a stylus) which occurs on the cover window 410. Various mechanisms of detecting a touch by the touch sensor 430 are well known in the art. Hereinafter, it may be described that the touch sensor 430 detects a touch input on the display 440, and this may mean that the touch sensor 430 detects the touch input that occurs on the cover window 410.

A fingerprint sensor 450 may be disposed under the display 440 (or the touch sensor 430). The fingerprint sensor 450 is formed to acquire user's fingerprint information when a user's finger is located above the cover window 410. According to various embodiments, the fingerprint sensor 450 is formed on a portion of the back sides of the display 440 and the touch sensor 430, so that the user is required to touch (or hover) a finger within a region of the display 440 and the touch sensor 430.

In the present disclosure, the disposition type of the fingerprint sensor 450 is not limited. For example, the fingerprint sensor 450 may have an in/on-cover glass structure in which a sensing unit or electrode for fingerprint sensing is disposed on the surface of the cover glass through printing or etching, an over-display structure in which the sensing unit or electrode is disposed on a display panel, an under-display structure in which the sensing unit or electrode is disposed under the display panel, an in-display structure in which the sensing unit or electrode is disposed inside pixels or in a black matrix (BM) region between the pixels, or the like.

Additionally, in the present disclosure, the type of the fingerprint sensor 450 is not limited. For example, the fingerprint sensor 450 may have an optical type of acquiring a fingerprint by capturing a fingerprint image of a finger surface through a photosensitive diode, a capacitive type of acquiring a fingerprint by using the principle that ridges of a fingerprint touched to the electrode are detected and non-touched grooves between ridges are not detected, or an ultrasonic type of acquiring a fingerprint by generating ultrasonic waves through a piezoelectric device and then using a path difference of the ultrasonic waves respectively reflected on the crest and trough of the fingerprint.

The following description will use the optical type fingerprint sensor disposed under the display 440 and the touch sensor 430 (i.e., disposed in the under-display structure), this is only. Alternatively, the above-discussed various types fingerprint sensors may be applied to the present disclosure.

FIG. 4B shows an example of a fingerprint sensor 470 located at a display 460 of an electronic device 400 according to various embodiments of the present disclosure.

Referring to FIG. 4B, the fingerprint sensor 470 is formed on the back side of the display 460 and may not be visually perceived by the user. In this case, at least one portion of each of the cover window (410 in FIG. 4A), the OCA (420 in FIG. 4A), the touch sensor (430 in FIG. 4A) and the display 460 is transparent or translucent to transmit a certain amount of light, and the fingerprint sensor 470 is disposed at the above transparent or translucent portion to acquire a user's fingerprint image. According to one embodiment, the electronic device 400 may have a hole formed between pixels in the at least one portion of the display 460 so that a certain amount of light may be transmitted through the hole. Although FIG. 4B shows the single fingerprint sensor 470 disposed at the bottom center of the display 460 to form a fingerprint sensing region, this is merely one example. There is no limitation in the number, position, and size of the fingerprint sensor 470.

The electronic device 400 according to various embodiments may predict the absolute position of a fingerprint inputted to the fingerprint sensor 470 by using touch information, such as the position and size of a finger, inputted to the touch sensor and also using a relative position between the touch sensor and the fingerprint sensor 470. Using the predicted position, the electronic device 400 may provide a suitable guide to the user who will make a fingerprint recognition gesture.

Figure 5:
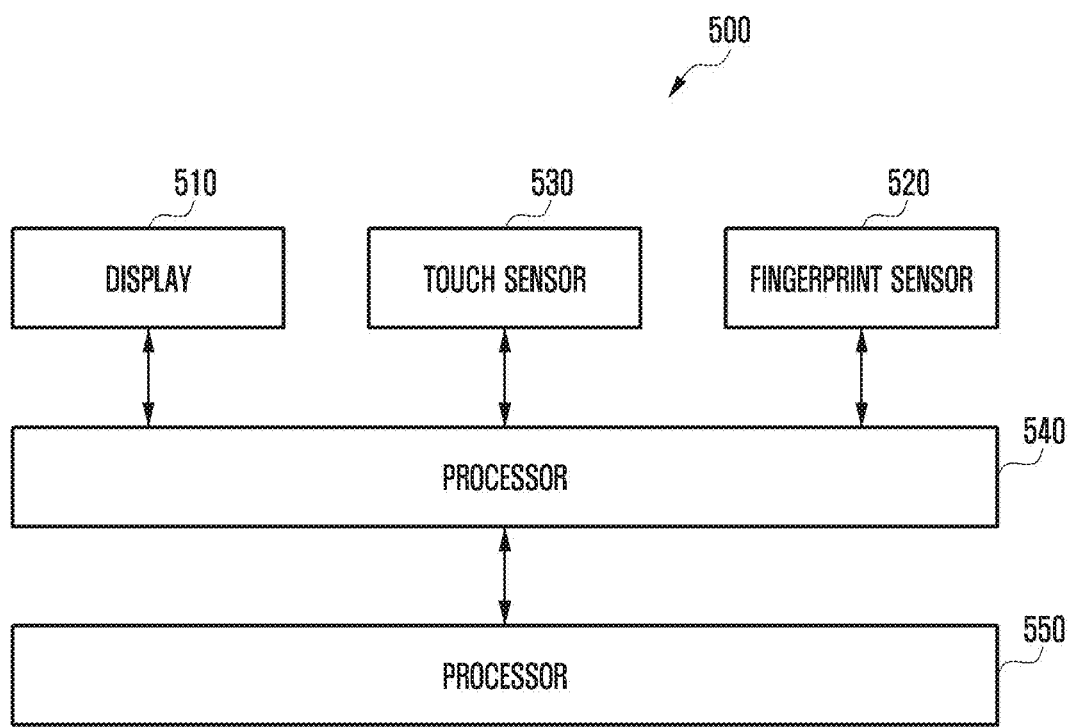
FIG. 5 is a block diagram illustrating an electronic device according to various embodiments of the present disclosure.

FIG. 5 is a block diagram illustrating an electronic device according to various embodiments of the present disclosure.

Referring to FIG. 5, the electronic device 500 according to various embodiments includes a display 510, a touch sensor 530, a fingerprint sensor 520, a processor 540, and a memory 550, some of which may be omitted or replaced with equivalents in various embodiments. In addition, the electronic device 500 may further include at least some of elements and/or functions of the electronic device 101 of FIG. 1 and/or 201 of FIG. 2.

According to various embodiments, the display 510 displays an image and may be implemented, but not limited to, as one of a liquid crystal display (LCD), a light-emitting diode (LED) display, an organic LED (OLED) display, a micro electro mechanical systems (MEMS) display, or an electronic paper display. The display 510 may include at least some of elements and/or functions of the display 160 of FIG. 1 and/or 260 of FIG. 2.

According to various embodiments, the touch sensor 530 may detect a touch input that occurs on a cover window (e.g., 410 of FIG. 4A) formed on the front of the display 510. The touch sensor 530 may include at least some of elements and/or functions of the touch panel 252 of FIG. 2.

According to various embodiments, when a single touch or multi-touch occurs, the touch sensor 530 may detect data including an X and Y field, a touch major and touch minor field, a size field, a pressure field, an orientation field, and the like. Here, the X and Y field may include data related to positional information about the center of a touch region, and the touch major and touch minor field may include the approximate size of the touch region on an output unit (e.g., the display 510). The size field may include the maximum possible size of a touch detectable by the touch sensor 530, the pressure field may include the size of a pressure detected physically by the touch sensor 530, and the orientation field may include the orientation of a touch input. These fields are merely, and the kind of data that can be acquired through the touch sensor 530 is not limited thereto.

According to various embodiments, the fingerprint sensor 520 may acquire user's fingerprint information. The fingerprint sensor 520 may be implemented, but not limited to, as an optical fingerprint sensor capable of acquiring a fingerprint image. The fingerprint information acquired by the fingerprint sensor 520 is stored as image information and may be used for authentication of the electronic device 500 through comparison with previously registered fingerprint information. The fingerprint sensor 520 may be formed on at least a portion of the back of the touch sensor 530 and/or the display 510. Therefore, when a touch input using a user's finger occurs on the cover window of the display 510, the touch sensor 530 may acquire touch information and, simultaneously at least in part, the fingerprint sensor 520 may acquire fingerprint information.

According to one embodiment, the fingerprint sensor 520 may be activated when the fingerprint recognition function is activated, for example, in an unlocking operation, when a security-enabled application such as a message application is executed, or the like. According to another embodiment, the fingerprint sensor 520 may be activated when the fingerprint recognition function is activated and also a touch input occurs on a portion of the fingerprint sensor 520.

According to various embodiments, the processor 540 is configured to perform operations and data processing with regard to control and/or communication of each element of the electronic device 500, and may include at least some of elements of the processor 120 of FIG. 1 and/or the application processor 210 of FIG. 2. The processor 540 may be electrically coupled to elements of the electronic device 500 such as the display 510, the touch sensor 530, the fingerprint sensor 520, and the memory 550.

The memory 550 is configured to temporarily or permanently store digital data, and may include at least one of the memory 130 of FIG. 1 and/or 230 of FIG. 2. The memory 550 may include a volatile memory and a nonvolatile memory. The nonvolatile memory may include at least one of a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD), and the volatile memory may include at least one of a dynamic random access memory (DRAM), a static RAM (SRAM), or a synchronous dynamic RAM (SDRAM).

The memory 550 may store various instructions executable by the processor 540. Such instructions may include control instructions such as arithmetic and logic operations, data transfer, input/output, etc., which are recognizable by the processor 540, and may be defined on a framework stored in the memory 550. The memory 550 may also store at least some of elements of the program module 310 as shown in FIG. 3.

According to various embodiments, there is no limitation in operating and data processing functions which are implementable in the electronic device 500 by the processor 540. Hereinafter, operations of determining and displaying a graphic object for guiding the acquisition of a user's fingerprint, based on touch information will be described in detail. Operations of the processor 540 to be described later may be performed by loading the above-mentioned instructions stored in the memory 550.

According to various embodiments, when a user's touch input occurs, the processor 540 may acquire touch information for the display 510 from the touch sensor 530. Then, based at least on the touch information, the processor 540 may determine a graphic object for guiding the acquisition of a user's fingerprint corresponding to the touch input. The graphic object may be an image, and may be various forms such as text, animation, and the like. When the graphic object is an image, the graphic object may be an image in the form of a fingerprint, or an image in the form of an ellipse including no fingerprint.

According to various embodiments, the processor 540 may determine, based on the touch information, the graphic object for a guide to the acquisition of the user's entire fingerprint region. Therefore, even if the size of the fingerprint sensor 520 is smaller than the size of a user's actual fingerprint, the user may suitably move the finger to allow the fingerprint sensor 520 to recognize the entire fingerprint.

The processor 540 may display the determined graphic object through the fingerprint sensing region of the display 510 or the proximity of the fingerprint sensing region. For example, the processor 540 may display at least a portion of the graphic object to overlap with at least a portion of the fingerprint sensing region. In addition, the processor 540 may move the graphic object, based on the touch region, or may change the size and/or orientation of the graphic object in response to a change in the size and/or orientation of the touch region.

According to various embodiments, when a touch is detected by the touch sensor 530 and is recognized as a touch by a user's finger, the processor 540 may receive the position and horizontal/vertical length of the touch from the touch sensor 530 and then create or determine the graphic object. According to one embodiment, the processor 540 may determine the size of the graphic object to be greater than the size of the user's finger acquired through touch information. For example, the processor 540 may arbitrarily adjust an aspect ratio of the graphic object (e.g., 1:2) in consideration of a finger shape.

Figure 6B:
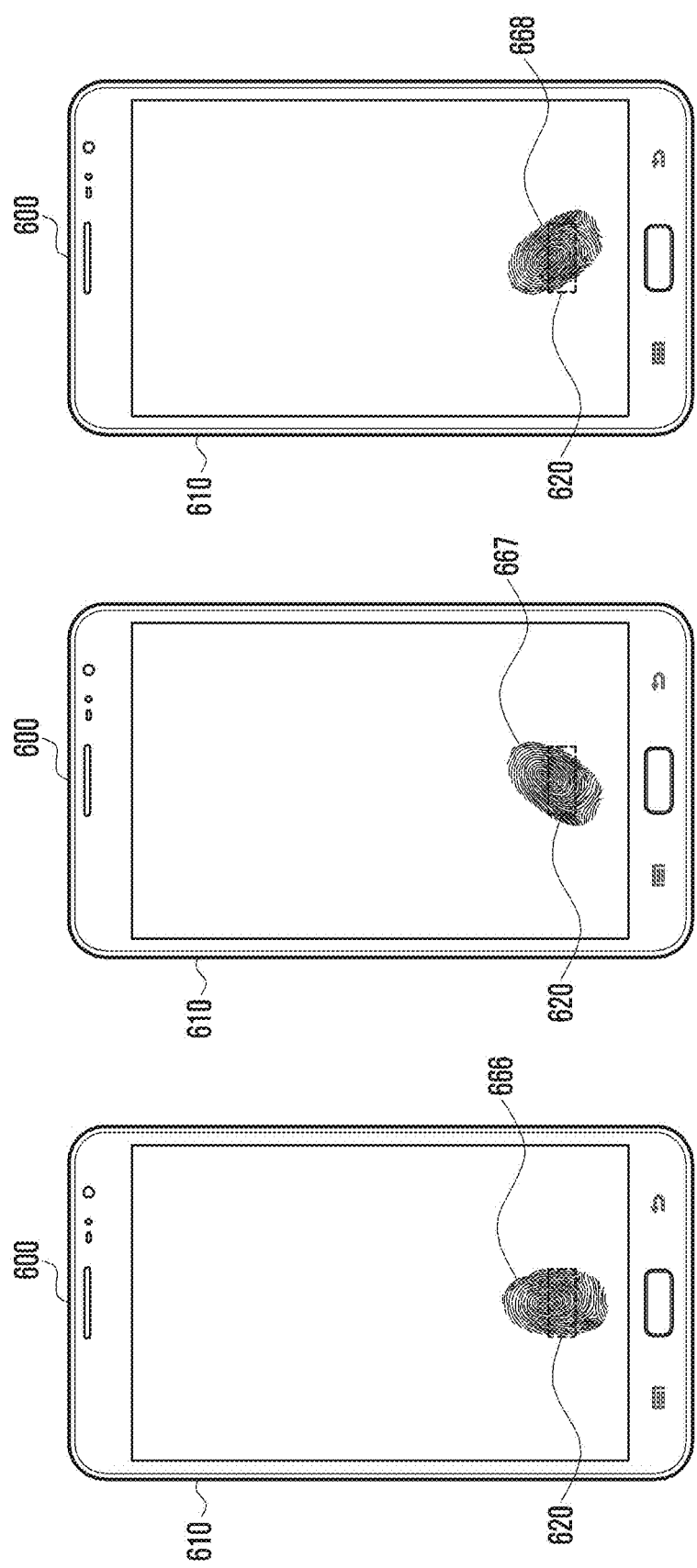

FIGS. 6A and 6B are diagrams illustrating examples of correcting a graphic object based on touch information according to various embodiments of the present disclosure.

According to one embodiment, the processor (e.g., the processor 540 in FIG. 5) may acquire, as touch information, the size (or area) of a touch input and then, based on the acquired size, determine the size of a graphic object. Since each user may have different finger sizes, the processor (e.g., the processor 540 in FIG. 5) may determine the size of the graphic object to be similar to the size of the user's finger to realize precise guidance.

For example, the processor may determine the size of the graphic object in response to the size of the user's finger as shown in FIGS. 6A and 6B. In FIG. 6A, the sizes of graphic objects 661, 662 and 663 are increased more and more from the first screenshot on the left to the third screenshot on the right. For example, if the size of the user's finger is small, namely if the size (or area) of the touch input is small, the processor may create a graphic object 661 of a small size as shown in the first screenshot of FIG. 6A. If the size of the user's finger is large, the processor may create a graphic object 663 of a large size as shown in the third screenshot.

The processor 540 may selectively display the graphic object 661, 662 or 663. When the user places a finger on the graphic object 661, 662 or 663, the processor 540 may acquire fingerprint information by using a fingerprint sensor corresponding to fingerprint sensing region 620.

According to one embodiment, the processor 540 may acquire, as touch information, orientation information of a touch input and, based on the acquired orientation information, determine the orientation of a graphic object. For example, when the user wishes to make a fingerprint recognition gesture with the thumb, a finger orientation may be varied depending on whether the user grips an electronic device 600 with the right hand, the left hand, or both hands. For example, if the user grips the electronic device 600 with the two hands and enters the fingerprint with the left or right thumb, the finger may not be tilted to the right or left. In this case, as shown in the first screenshot of FIG. 6B, the processor 540 may determine the orientation of a graphic object 667 to not be tilted to the right or left. According to an another embodiment, the processor 540 may determine the orientation of a graphic object 667 to be tilted to the right or left, based on an information that the user determined before. Also, if the user grips the electronic device 600 with the left hand and enters the fingerprint with the left thumb, the finger may be tilted to the right. In this case, as shown in the second screenshot of FIG. 6B, the processor 540 may determine the orientation of a graphic object 667 to be tilted to the right. Similarly, if the user grasps the electronic device 600 with the right hand and enters the fingerprint with the right thumb, the finger may be tilted to the left. In this case, as shown in the third screenshot of FIG. 6B, the processor 540 may determine the orientation of a graphic object 668 to be tilted to the left.

According to one embodiment, the electronic device 600 may determine a user's grip mode (e.g., a right-hand mode, a left-hand mode, a two-hand mode) by using a sensing value of any sensor (e.g., a camera, a gyro sensor, a geomagnetic sensor, a grip sensor, or the like) instead of the touch sensor, and may determine the orientation of the graphic object in response to the user's grip mode.

According to one embodiment, when the touch sensor detects a touch by a user's finger, the processor 540 may create or determine a suitable graphic object and display the graphic object on the display 610. According to one embodiment, based at least on touch information, the processor 540 may determine whether a user's fingerprint is touched. Since a user's fingerprint is formed of raised ridges and grooves between ridges, the processor 540 may determine that a user's fingerprint is touched when touch information detected by the touch sensor has a pattern of repetition between ridges and grooves. According to one embodiment, the processor 540 may display the graphic object on the display 610 depending on the type of application. For example, in case of a particular application that requires fingerprint acquisition (e.g., Samsung Pay), the processor 540 may display the graphic object.

FIGS. 7A to 7F are diagrams illustrating examples of correcting a graphic object based on touch information according to various embodiments of the present disclosure.

Figure 7A:
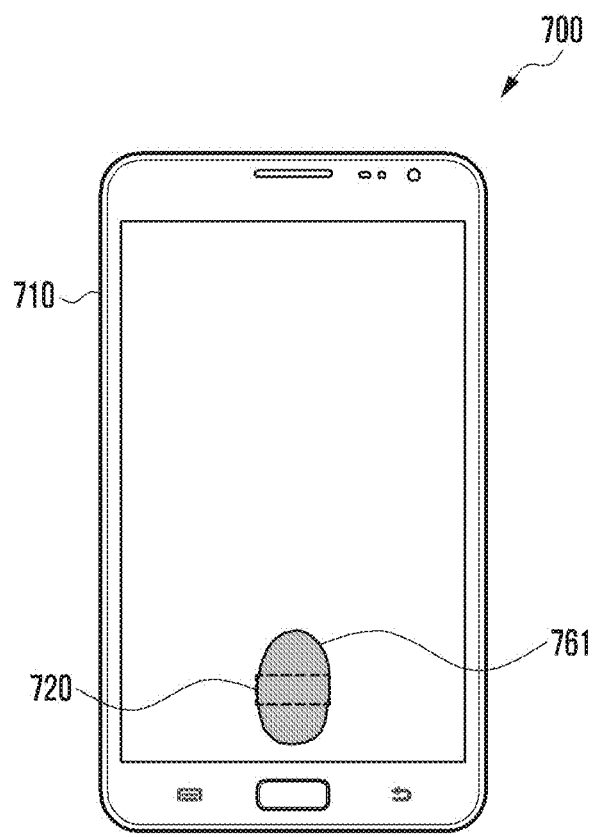
FIGS. 7A, 7B, 7C, 7D, 7E, and 7F are diagrams illustrating examples of correcting a graphic object based on touch information according to various embodiments of the present disclosure.

When the fingerprint recognition function is activated, the processor (e.g., 540 of FIG. 5) may display a graphic object 761 as shown in FIG. 7A. The graphic object 761 may be determined as default and displayed before touch information is reflected and/or before the fingerprint sensor performs fingerprint recognition, or may be a graphic object determined in a previous fingerprint recognition process. The processor 540 may display the graphic object 761 to overlap with at least a portion of a fingerprint sensing region 720.

When a user's touch occurs, the processor 540 may receive touch information from the touch sensor and identify the type of the touch (e.g., a finger, a stylus, a mouse, etc.). If the touch type is a finger touch, the processor 540 may identify touch coordinates from the touch information. For example, the touch coordinates are coordinate information of the center of a touch-occurring region, and may include the value of the x-axis and the value of the y-axis on the basis of the resolution of a display 710 of an electronic device 700.

Figure 7B:
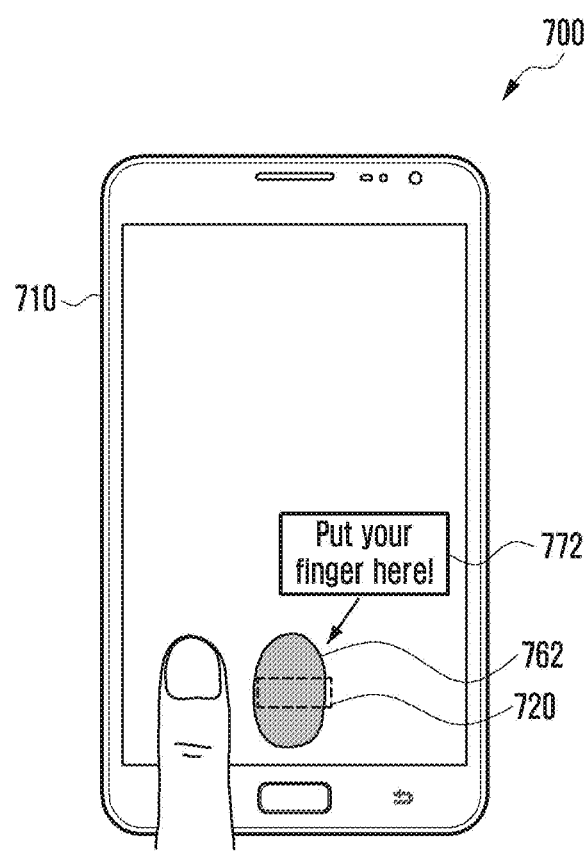

According to one embodiment, if the touch coordinates are not contained in the graphic object 762 and/or in the fingerprint sensing region 720, for example, if the user touches the display 710 at any region other than the graphic object 762 and/or the fingerprint sensing region 720, the processor 540 may provide a visual feedback for guiding the movement of a finger. As shown in FIG. 7B, the processor 540 may display, as a visual feedback, text information 772 in a portion of the display 710 so as to guide a user's finger to the graphic object 762. In another embodiment, the processor 540 may provide a visual feedback to the graphic object 762 itself, such as changing the color of the graphic object 762 or giving a blinking effect. In addition, the processor 540 may provide any other feedback such as a vibration, a sound effect, or the like.

According to one embodiment, using the touch sensor, the processor 540 may detect a hovering input within a predetermined distance in addition to the touch input. The processor 540 may identify coordinate information of the hovering input from the touch sensor and, when a user's finger is approaching at any region other than the graphic object 762 and/or the fingerprint sensing region 720, may provide a visual feedback for guiding the movement of the finger.

Figure 7C:
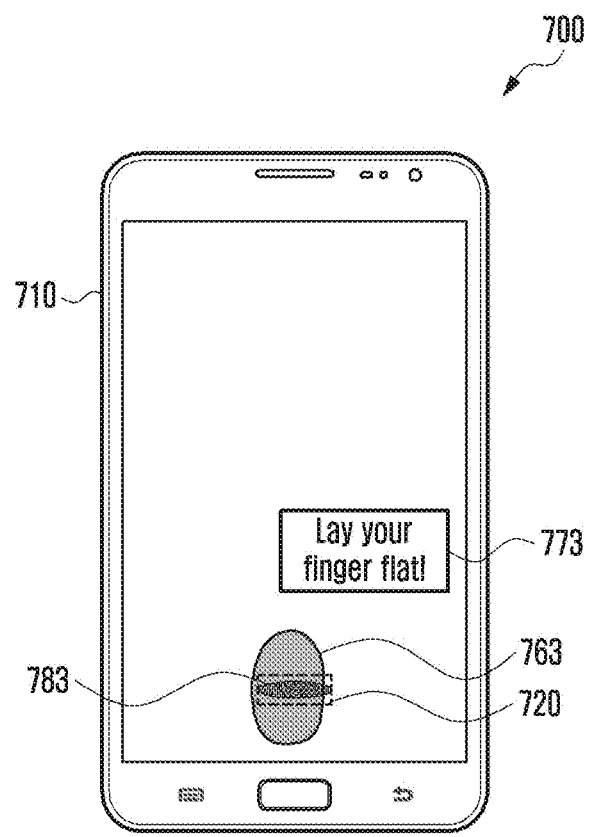

If the touch coordinates are contained in the graphic object (e.g., 763 in FIG. 7C), the processor 540 may acquire width and height information of the touch from the touch sensor. If the width and height information fails to satisfy a specified condition, the processor 540 may provide a visual feedback (e.g., 773 in FIG. 7C) so that the specified condition may be satisfied. For example, if a user's touch uses a fingertip 783 instead of a fingerprint area of the finger, the processor 540 may recognize a touch of the fingertip from the width and height information of the touch and, as shown in FIG. 7C, provide a visual feedback 773 for guiding the user to lay the finger flat.

Figure 7D:
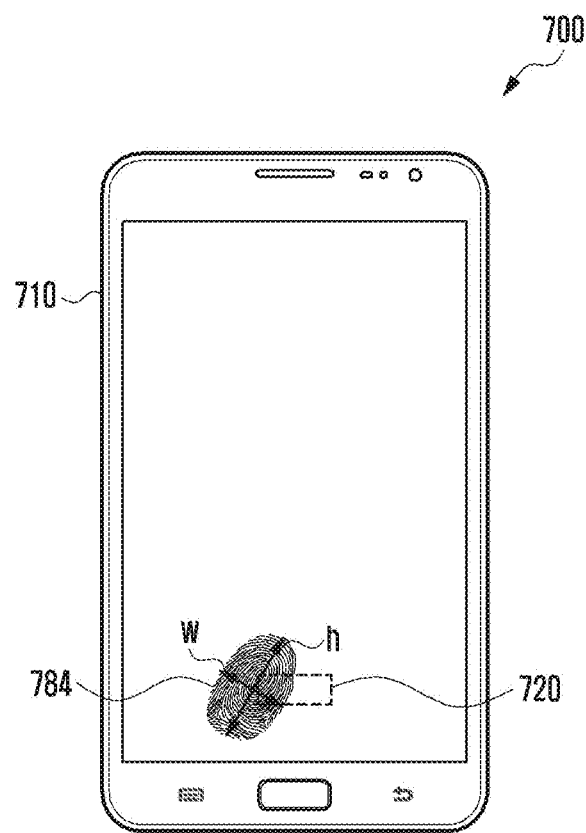

If the width and height information acquired from the touch sensor satisfies a specified condition (e.g., a touch of the finger laid flat) as shown in FIG. 7D, the processor 540 may store the width (w) and height (h) information. In addition, the processor 540 may acquire orientation information of the touch. Since a touch using a finger is normally longer in length than in width, the processor 540 may identify the orientation information of the touch from the degree of tilt with regard to the relatively longer vertical direction. According to one embodiment, based on the identified orientation information of the touch, the processor 540 may change the orientation of a graphic object 784.

Figure 7E:
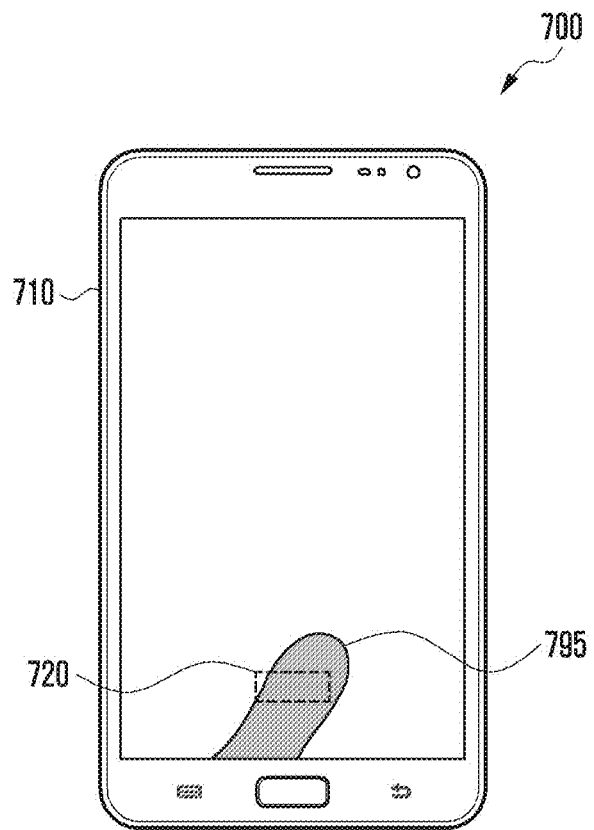

The processor 540 may determine an absolute position of an actually acquired fingerprint, based on the touch coordinates, the width and height information, and the orientation information acquired from the touch sensor. As shown in FIG. 7E, the processor 540 may provide the user with a feedback 795 indicating a region where an actual touch is made.

Figure 7F:
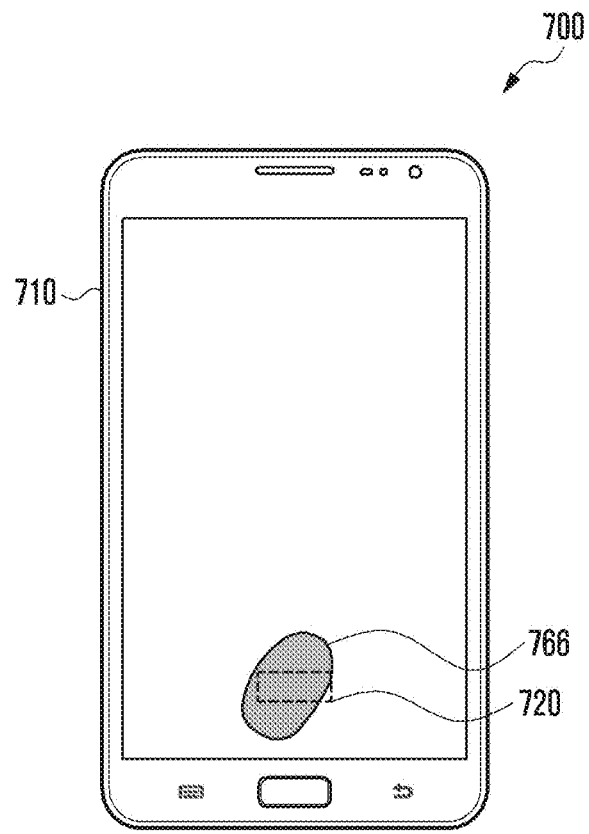

The processor 540 may determine and display the position and orientation of a graphic object 766, based on the absolute position of the acquired fingerprint. As shown in FIG. 7F, the processor 540 may determine the width, length and/or orientation of the graphic object 766, based on touch information. Then the processor 540 may display the graphic object 766 through the fingerprint sensing region 720 and the proximity thereof. As described so far, the graphic object 766 created by reflecting the touch information as shown in FIG. 7F may be different in at least one of size, orientation and position from the graphic object 761 displayed before the occurrence of the touch as shown in FIG. 7A.

Therefore, the user may move the finger while seeing the displayed graphic object 766, so that the fingerprint sensor corresponding to the fingerprint sensing region 720 may acquire a fingerprint image with regard to the entire fingerprint region.

FIGS. 8A to 8D are diagrams illustrating examples of adjusting the position of a graphic object based on touch information according to various embodiments of the present disclosure.

According to one embodiment, the processor (e.g., 540 of FIG. 5) may determine, in a region of a display 810 of an electronic device 800 touched by a touch input, a first region that is overlapped with a fingerprint sensing region 820, and a second region that is not overlapped with the fingerprint sensing region 820, based on at least a portion of the touch information. The processor 540 may determine the position, shape, or size of a graphic object, based at least on the determined first or second region.

Figure 8A:
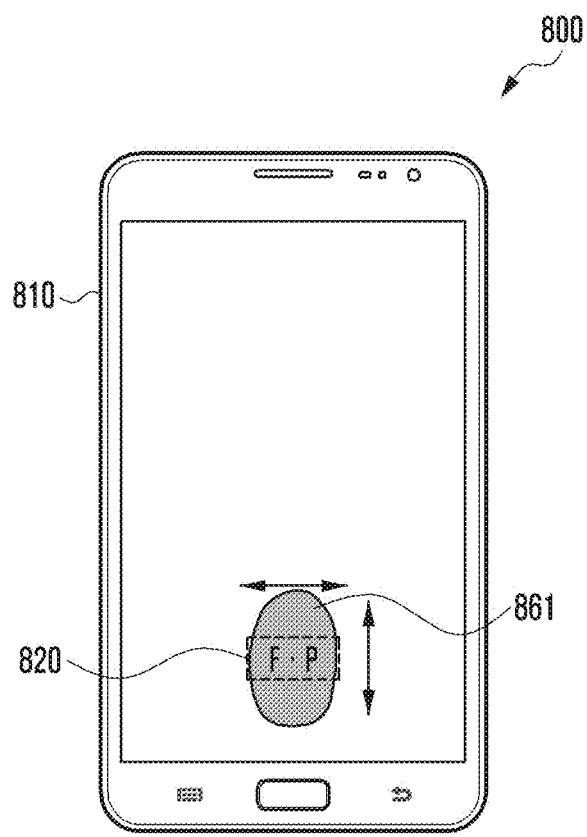
FIGS. 8A, 8B, 8C, and 8D are diagrams illustrating examples of adjusting the position of a graphic object based on touch information according to various embodiments of the present disclosure.

The processor 540 may move the graphic object widthwise or lengthwise as shown in FIG. 8A to allow the user to locate the entire region of the finger evenly in the fingerprint sensing region 820. For example, the processor 540 may determine the first region where the fingerprint sensing region 820 is overlapped with the region touched by the touch input, and the second region that is not overlapped. The processor 540 may determine a relative position of a current finger region with respect to the fingerprint sensing region 820, based on the first and second regions, and then determine the position of a graphic object 861, based on the relative position. For example, the processor 540 may move the graphic object 861 widthwise or lengthwise in consideration of the size of the fingerprint sensing region 820 and the calculated size of the graphic object 861, thereby inducing the user to place the finger on the graphic object.

Figure 8B:
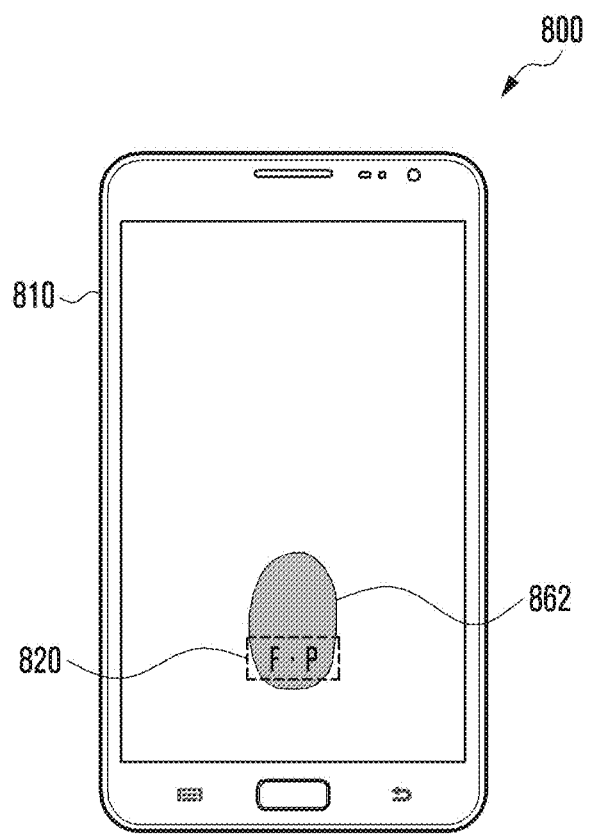

As shown in FIG. 8B, the processor 540 may display a graphic object 862 to be partially overlapped with the fingerprint sensing region 820 at an upper position. When the user places the finger at the position of the graphic object 862 in a state where the graphic object 862 is displayed as shown in FIG. 8B, the fingerprint information of the lower portion of the finger may be acquired. In this case, the second region in which the region touched by the touch input is not overlapped with the fingerprint sensing region 820 may be distributed considerably beyond the upper end of the fingerprint sensing region 820.

Figure 8C:
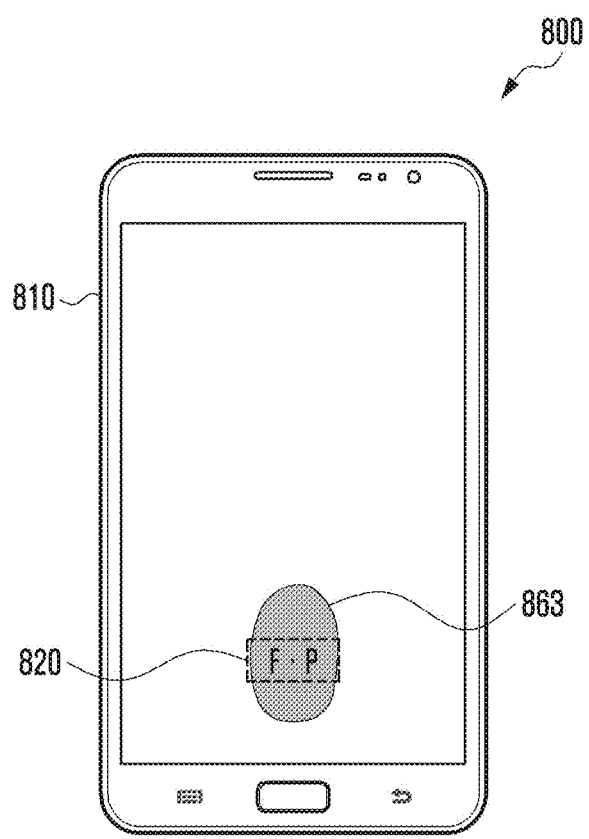

In order to acquire a fingerprint region that is not acquired through the fingerprint sensor, the processor may move the position of a graphic object 863 downward as shown in FIG. 8C. When the user places the finger at the position of the graphic object 863 in a state as shown in FIG. 8C, the fingerprint information of the middle portion of the finger may be acquired. In this case, the second region may be similar in size above and below the fingerprint sensing region 820.

Figure 8D:
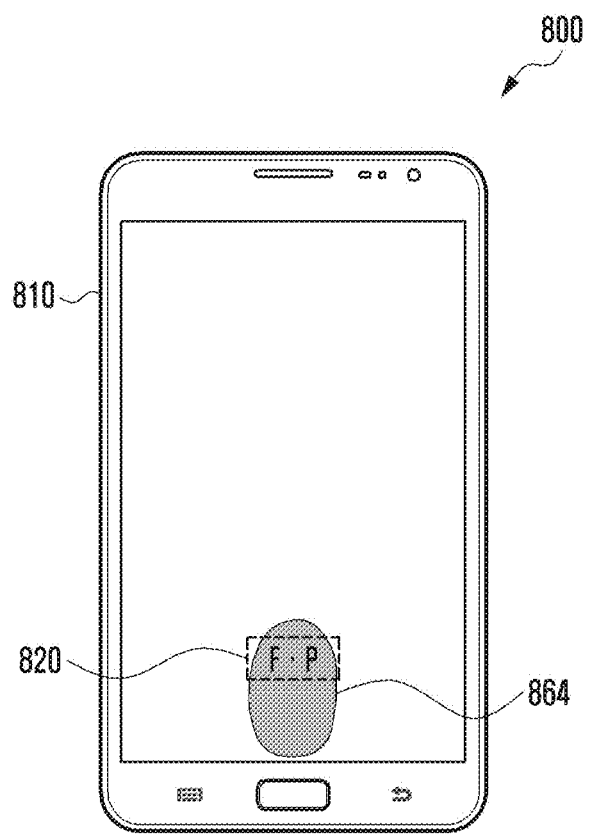

In order to acquire a fingerprint region that is not acquired through the fingerprint sensor, the processor may move the position of a graphic object 864 further downward as shown in FIG. 8D. When the user places the finger at the position of the graphic object 864 in a state as shown in FIG. 8D, the fingerprint information of the upper portion of the finger may be acquired.

According to one embodiment, when the user inputs a fingerprint, the processor 540 may calculate a portion where the graphic object is overlapped with a region corresponding to the sensor position, and may display the calculated portion to the user when the user releases the touch. If the user fails to touch the actual position of the fingerprint sensor, the processor 540 may induce re-registration without updating the fingerprint information.

Figure 9A:
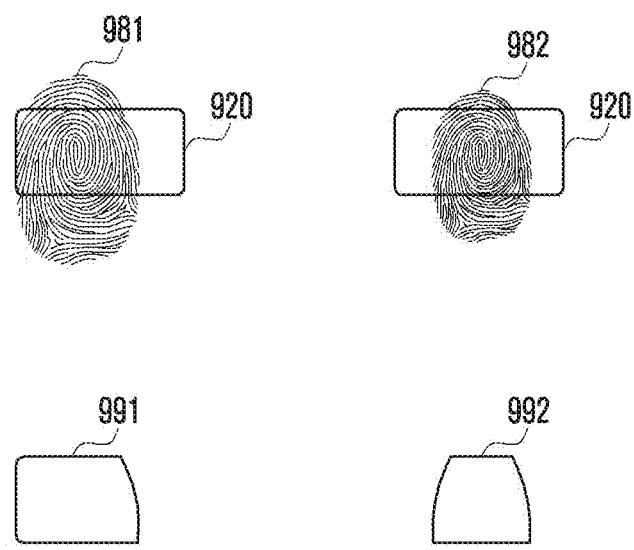
FIGS. 9A and 9B are diagrams illustrating examples of adjusting the brightness of a region corresponding to a fingerprint sensor according to various embodiments of the present disclosure.
Figure 9B:
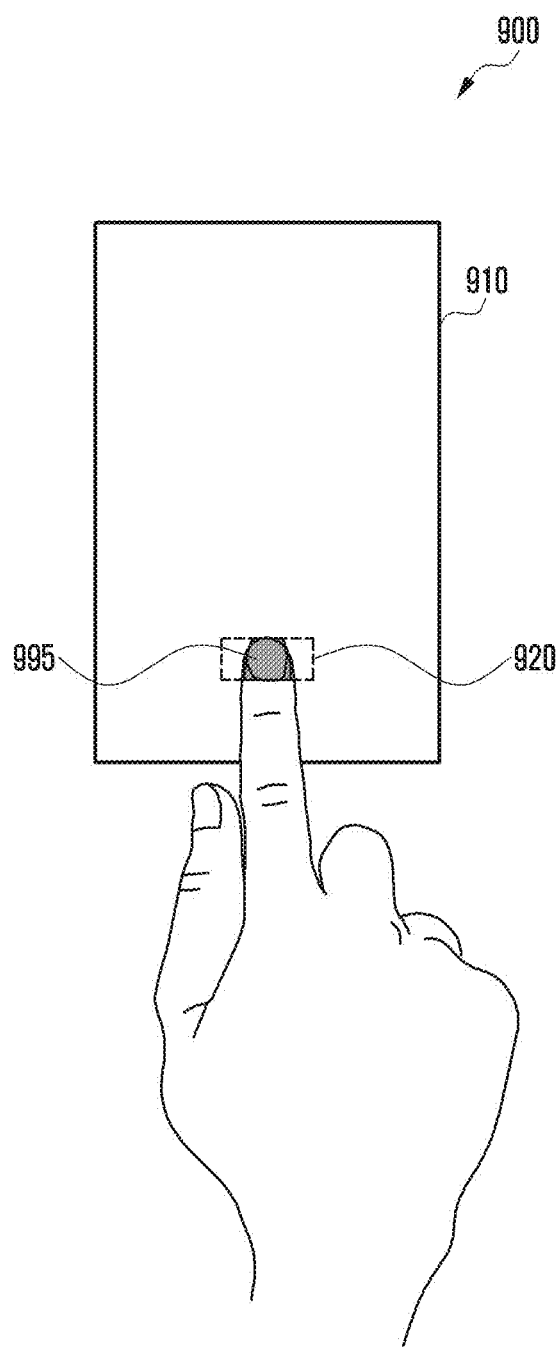

FIGS. 9A and 9B are diagrams illustrating examples of adjusting the brightness of a region corresponding to a fingerprint sensor according to various embodiments of the present disclosure.

According to one embodiment, the fingerprint sensor may be an optical sensor. When the fingerprint sensor acquires a fingerprint image, the processor (e.g., 540 of FIG. 5) may output a certain level of light to a fingerprint sensing region 920 by using the display 910 of an electronic device 900. For example, if the display is turned off altogether, or if the ambient light is dark, some regions of the display may flash or the user interface (UI) displayed in other regions of the display may be changed in color at the moment of outputting light. This may give the user a sense of heterogeneity or impression of a display error.

According to one embodiment, the electronic device may adjust only the color or brightness of a user's touch region. According to one embodiment, the processor 540 may determine a region overlapped with the fingerprint sensing region 920 in the touch region, based at least on touch information, and change the color or brightness of the overlapped region. For example, the processor 540 may change the color of the overlapped region to a suitable color (e.g., green or white) for helping the fingerprint acquisition, and also change the brightness to a certain brightness or more to help the fingerprint acquisition.

When a user's touch 995 is detected in the fingerprint sensing region 920, the processor 540 may determine an overlapped region 991 or 992 between a touch region 981 or 982 and the fingerprint sensing region 920. To enable the fingerprint sensor to acquire a fingerprint image, the processor 540 may change the color or brightness of the overlapped region 991 or 992 on the display. Since the overlapped region 991 or 992 corresponds to a portion of the touch region where the user's finger is touched, the change in color or brightness performed within the overlapped region 991 or 992 may be hidden by the user's finger and thus not be perceived by the user. In addition, such a change is not performed in the regions other than the overlapped region 991 or 992. Therefore, the user may not perceive the change in color or brightness in the entire area of the display.

When the user releases the touch, the processor 540 may maintain the changed color or brightness of the overlapped region 991 or 992 for a given time. Additionally or alternatively, the changed color or brightness of the overlapped region 991 or 992 may return to the original color or brightness along with a fade-out effect. Therefore, the user may recognize the region where the fingerprint is actually recognized on the fingerprint sensing region 920.

Figure 10A:
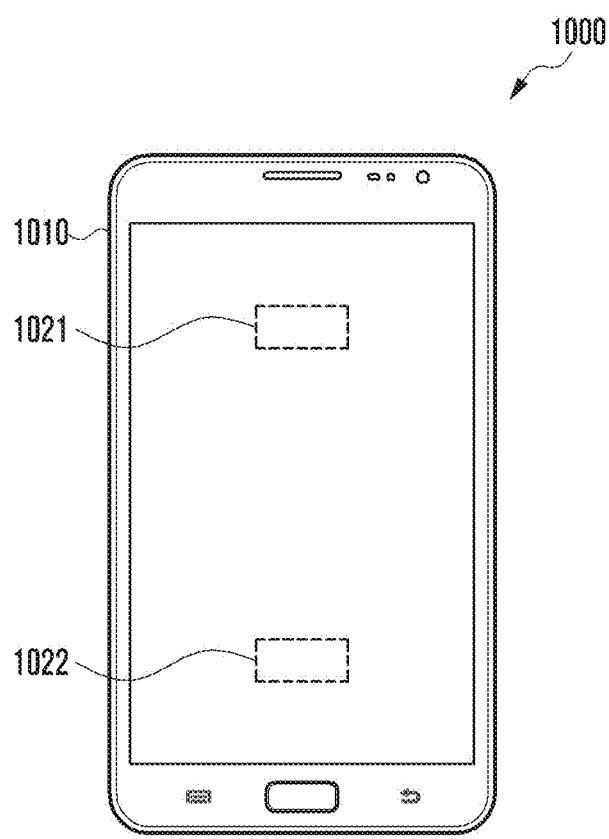
FIGS. 10A and 10B are diagrams illustrating an electronic device having a plurality of fingerprint sensors according to various embodiments of the present disclosure.
Figure 10B:
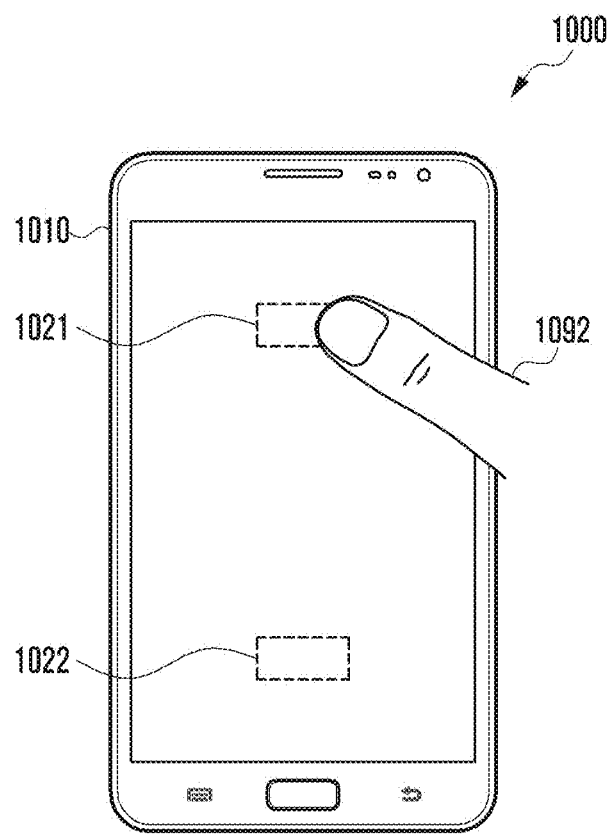

FIGS. 10A and 10B are diagrams illustrating an electronic device having a plurality of fingerprint sensors according to various embodiments of the present disclosure.

According to one embodiment, the electronic device 1000 may include a plurality of fingerprint sensors, each of which may be formed in at least a portion of the back side of a display 1010. As shown in FIG. 10A, the display 1010 may have fingerprint sensing regions 1021 and 1022 that correspond to the fingerprint sensors, respectively.

According to one embodiment, when the fingerprint recognition function is activated, a processor (e.g., 540 of FIG. 5) of the electronic device 1000 may activate only the fingerprint sensor corresponding to fingerprint sensing region 1021 that corresponds to the position where a user's touch input 1092 occurs as shown in FIG. 10B, rather than activate all the fingerprint sensors corresponding to fingerprint sensing regions 1021 and 1022. Alternatively or additionally, the processor may change only the color or brightness of the corresponding fingerprint sensing region 1021.

Figure 11:
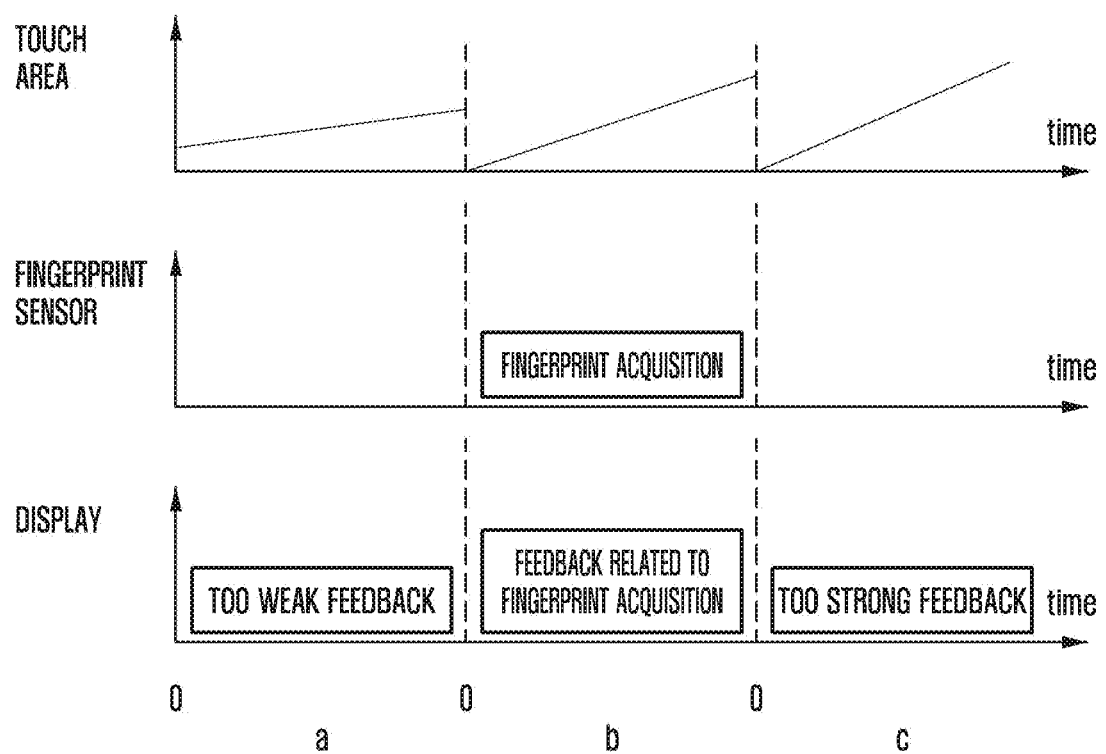
FIG. 11 is a diagram illustrating an example of providing feedback related to fingerprint acquisition depending on a variation in touch area according to various embodiments of the present disclosure.

FIG. 11 is a diagram illustrating an example of providing feedback related to fingerprint acquisition depending on a variation in touch area according to various embodiments of the present disclosure.

According to one embodiment, when a touch input occurs in the fingerprint sensing region, a processor (e.g., 540 of FIG. 5) may perform fingerprint recognition depending on a variation in touch area, or provide a suitable feedback to the user. For this, the processor may calculate the variation in touch area with respect to the touch time, and determine whether the touch area variation per a given time is within a predetermined range.

For example, the first section (a) in FIG. 11 indicates a small variation in touch area according to time. This may mean that a user's touch is weak in strength. In this case, the processor may provide a visual feedback on the display to inform a weak touch. The second section (b) in FIG. 11 indicates a moderate variation in touch area according to time. This may mean that a user's touch has suitable strength for performing fingerprint recognition. In this case, the processor may perform the fingerprint recognition through the fingerprint sensor and, simultaneously at least in part, provide a feedback related to the fingerprint acquisition. The third section (c) in FIG. 11 indicates a great variation in touch area according to time. This may mean that a user's touch is strong in strength. In this case, the processor may provide a visual feedback on the display to inform a strong touch.

Figure 12:
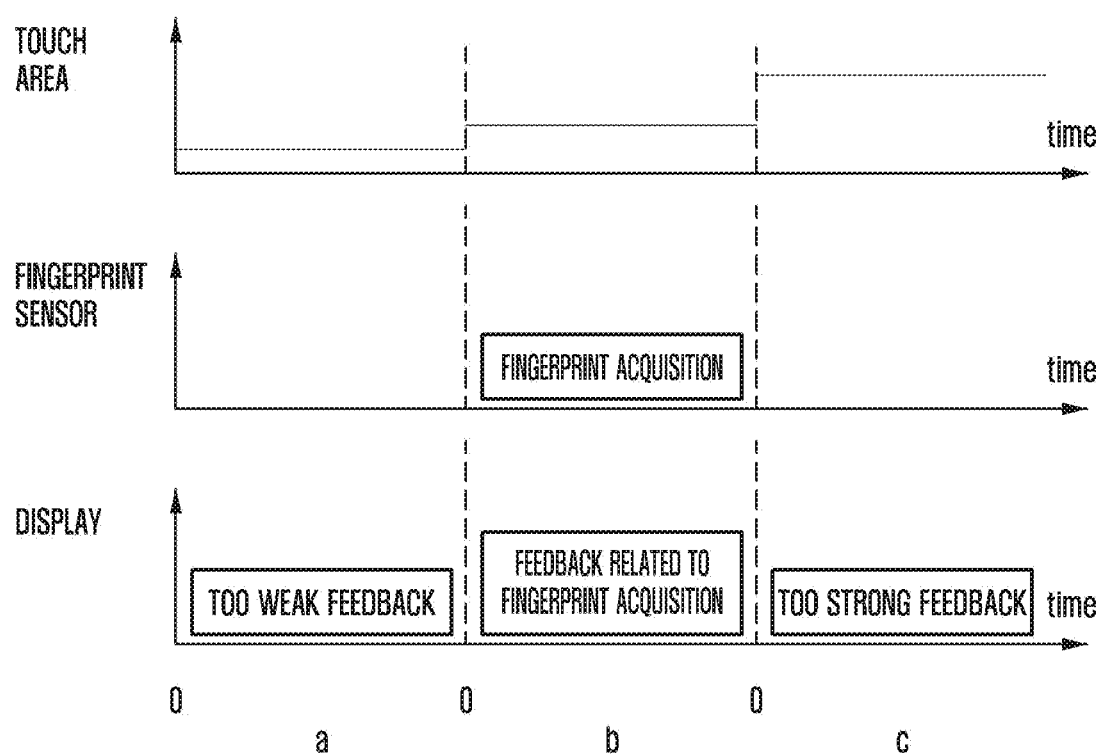
FIG. 12 is a diagram illustrating an example of providing feedback related to fingerprint acquisition depending on a touch pressure according to various embodiments of the present disclosure.

FIG. 12 is a diagram illustrating an example of providing feedback related to fingerprint acquisition depending on a touch pressure according to various embodiments of the present disclosure.

According to one embodiment, when a touch input occurs in the fingerprint sensing region, a processor (e.g., 540 of FIG. 5) may perform fingerprint recognition depending on a touch pressure, or provide a suitable feedback to the user.

For this, the processor may acquire a touch pressure value of the fingerprint sensing region from the touch sensor, and determine whether the touch pressure value is within a predetermined range.

For example, the first section (a) in FIG. 12 indicates a low pressure. In this case, the processor may provide a visual feedback on the display to inform a weak touch. The second section (b) in FIG. 12 indicates a moderate pressure. Since this may mean that a user's touch has suitable strength for performing fingerprint recognition, the processor may perform the fingerprint recognition through the fingerprint sensor and, simultaneously at least in part, provide a feedback related to the fingerprint acquisition. The third section (c) in FIG. 12 indicates a high pressure. In this case, the processor may provide a visual feedback on the display to inform a strong touch.

Figure 13:
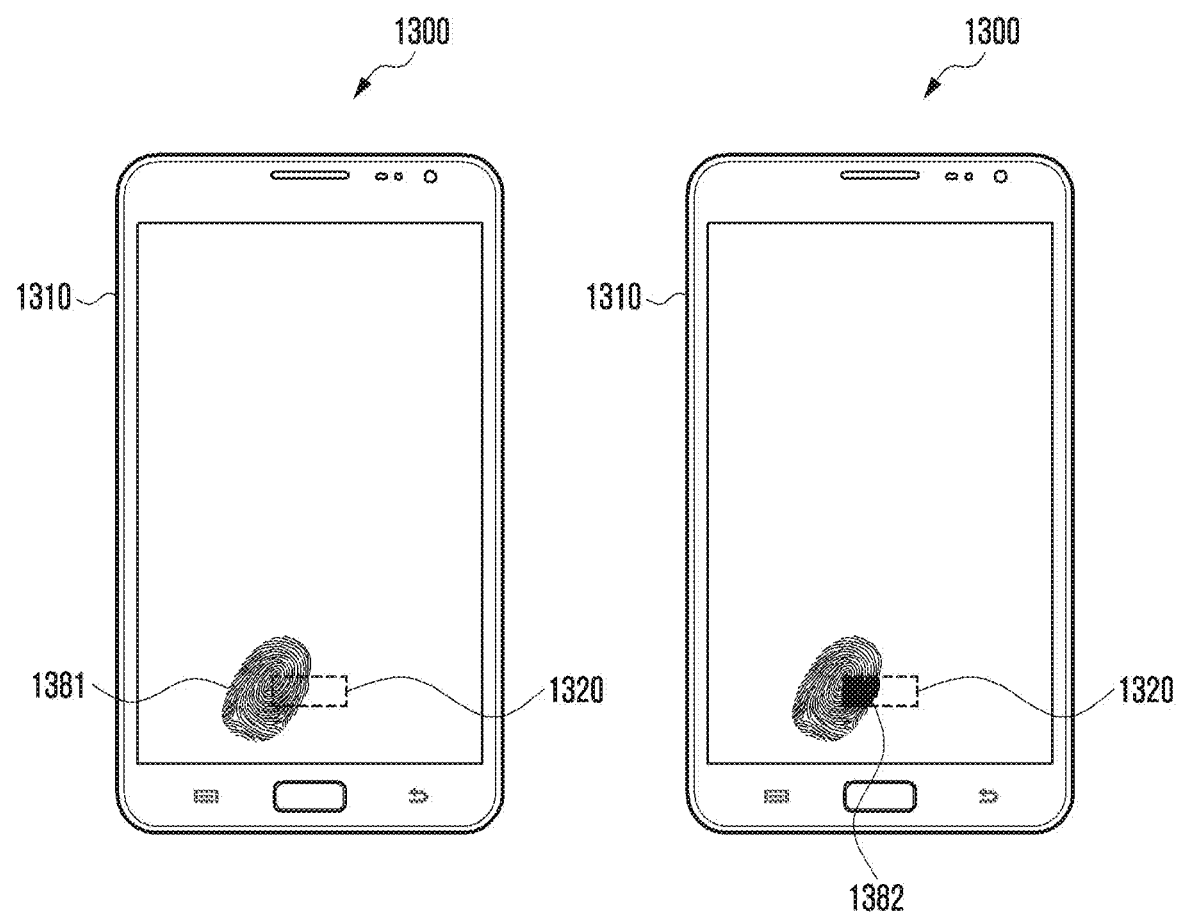
FIG. 13 is a diagram illustrating an example of a touch made only on a partial region of a fingerprint sensor according to various embodiments of the present disclosure.

FIG. 13 is a diagram illustrating an example of a touch made only on a partial region of a fingerprint sensor according to various embodiments of the present disclosure.

Referring to FIG. 13, when there is a user's touch input, a fingerprint region 1381 of the finger may be overlapped in part only with a fingerprint sensing region 1320 of a display 1310 of electronic device 1300. In this case, a processor (e.g., 540 of FIG. 5) may keep the fingerprint sensor in an inactive state and provide a visual feedback so that the user may move the position of the finger. According to one embodiment, when the user releases the touch, the processor may highlight and display an overlapped region 1382 between the fingerprint region 1381 of the finger and the fingerprint sensing region 1320 of the display 1310. Then, if the user exactly touches the fingerprint sensing region 1320 with the finger, the processor may activate the fingerprint sensor to perform fingerprint recognition.

Figure 14:
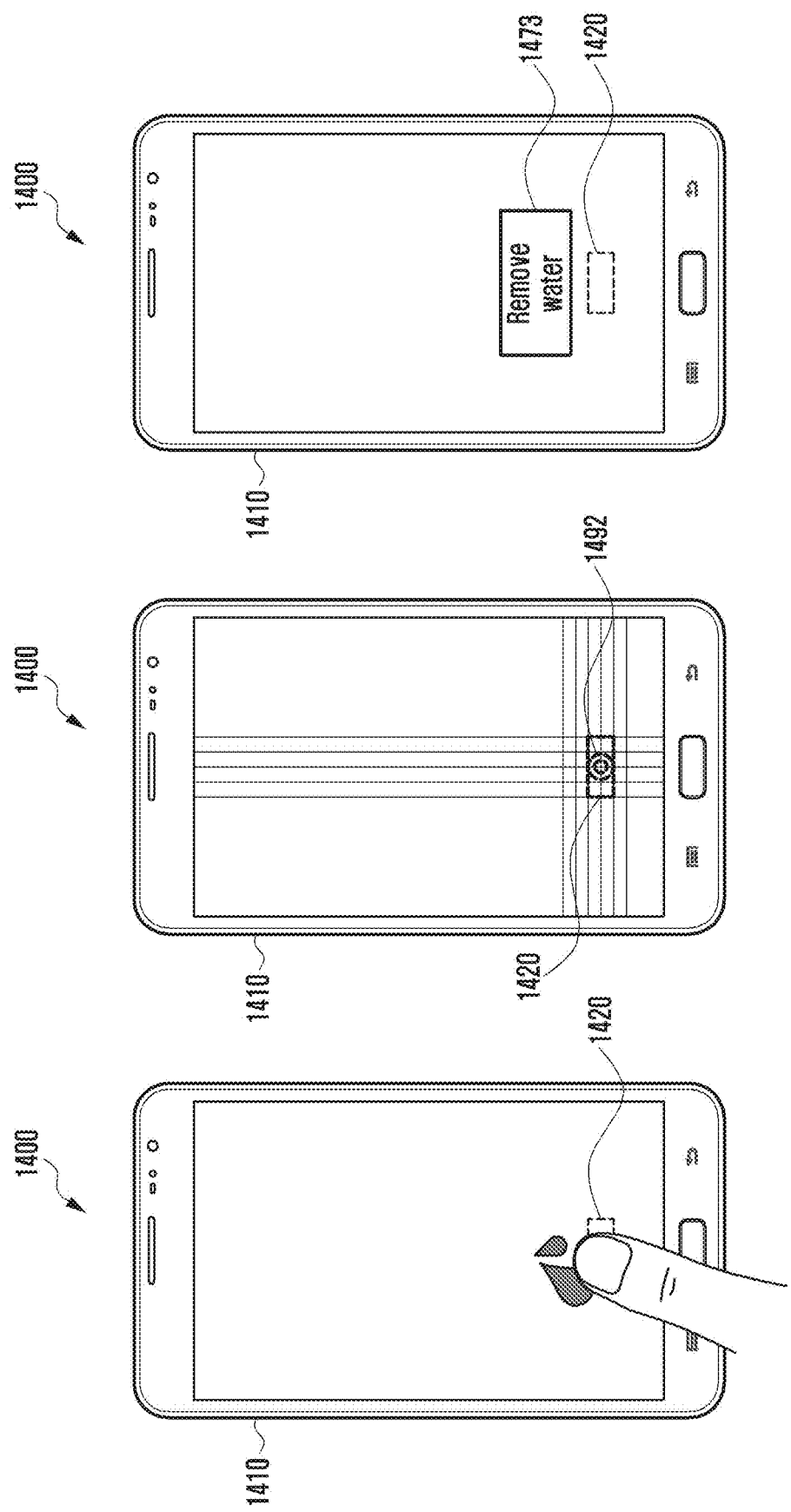
FIG. 14 is a diagram illustrating an example of failing in fingerprint sensing because of water according to various embodiments of the present disclosure.

FIG. 14 is a diagram illustrating an example of failing in fingerprint sensing because of water according to various embodiments of the present disclosure.

If there is water on a display 1410 of an electronic device 1400, accurate fingerprint recognition may be difficult because of refraction of light. A processor (e.g., 540 of FIG. 5) may receive variations in charge at touch coordinates 1492 from the touch sensor 1420 and then determine whether there is water around the touch coordinates. If there is water, the processor may provide a suitable feedback 1473 for removing water.

According to various embodiments, an electronic device may comprise a touch sensor, a fingerprint sensor, a display including a display region having a fingerprint sensing region, and a processor. In the electronic device, the processor may be configured to detect a touch input for the fingerprint sensing region by using the touch sensor, and to acquire touch information, corresponding to the touch input, on the display. Additionally, the processor may be configured to determine a graphic object for guiding acquisition of a user's fingerprint corresponding to the touch input through the fingerprint sensing region, at least based on the touch information. Also, the processor may be configured to display the graphic object through the fingerprint sensing region of the display or proximity thereof.

According to various embodiments, the processor may be further configured to acquire a size of the touch input, as the touch information, and to determine a size of the graphic object, based on the acquired size.

According to various embodiments, the processor may be further configured to acquire orientation information of the touch input, as the touch information, and to determine an orientation of the graphic object, based on the acquired orientation information.

According to various embodiments, the processor may be further configured to determine, as at least part of the touch information, a first region overlapped with the fingerprint sensing region and a second region not overlapped with the fingerprint sensing region in a region touched by the touch input, and to determine a position, shape, or size of the graphic object, at least based on the determined first or second region.

According to various embodiments, the processor may be further configured to determine whether the first region satisfies a specified condition, at least based on a size, position, or shape of the first region, and to provide a visual feedback for a touch movement through the display when the first region fails to satisfy the specified condition.

According to various embodiments, the processor may be further configured to determine that the first region satisfies the specified condition when the size of the first region is larger than or equal to a specified size capable of fingerprint recognition with respect to the fingerprint sensing region.

According to various embodiments, the processor may be further configured to determine a region overlapped with the fingerprint sensing region in a region touched by the touch input, at least based on the touch information, and to change a color or brightness of the overlapped region.

According to various embodiments, the processor may be further configured to activate the fingerprint sensor when the touch input for the fingerprint sensing region is detected at the touch sensor.

According to various embodiments, the processor may be further configured to determine a variation in area of the touch input or a pressure of the touch input, at least based on the touch information, and to provide a visual feedback through the display when the variation in area of the touch input or the pressure of the touch input exceeds a predetermined range.

According to various embodiments, the fingerprint sensor may be formed at a portion of a back side of the touch sensor.

According to various embodiments, the processor may be further configured to identify a position of a hovering touch, and to provide a feedback when the position of the hovering touch is not contained in the fingerprint sensing region.

Figure 15:
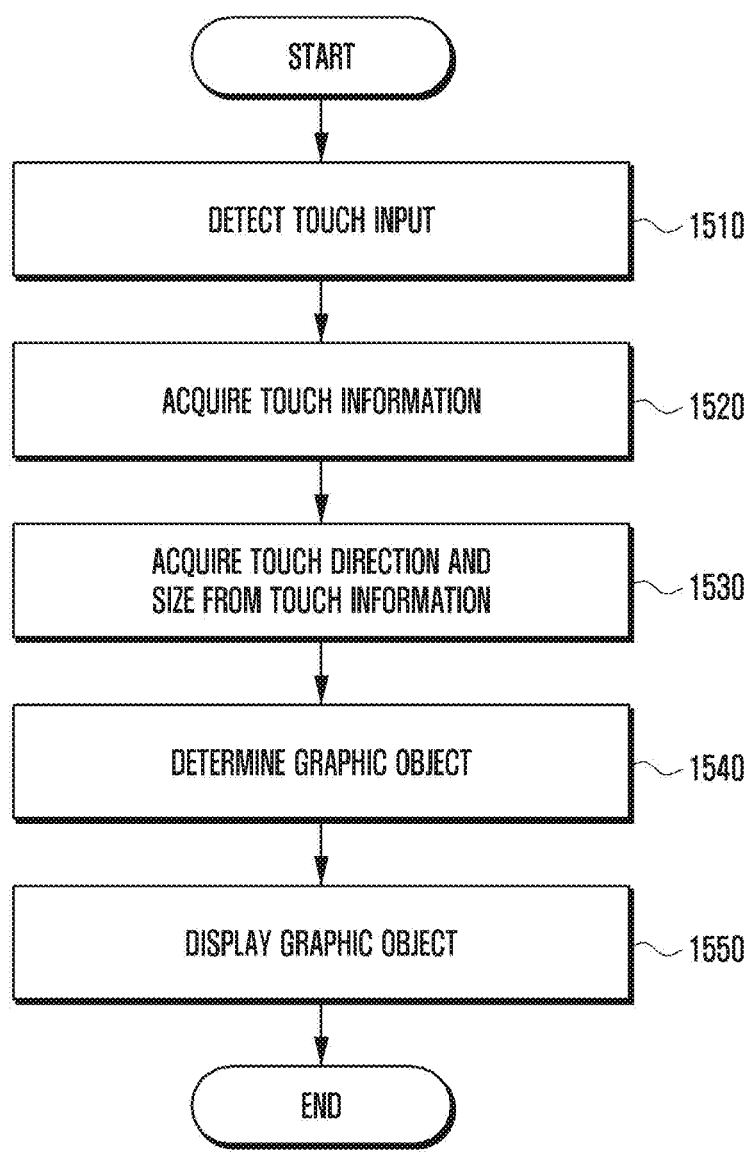
FIG. 15 is a flow diagram illustrating a fingerprint recognition method of an electronic device according to various embodiments of the present disclosure.

FIG. 15 is a flow diagram illustrating a fingerprint recognition method of an electronic device according to various embodiments of the present disclosure.

The illustrated method may be performed by the electronic device described above with reference to FIGS. 1 to 14. Hereinafter, the description of the above-discussed technical features will be omitted. According to various embodiments, the electronic device may include a touch sensor, a fingerprint sensor, and a display that includes a display region in which a fingerprint sensing region is formed.

At operation 1510, the electronic device (e.g., the processor 540) may detect a touch input for the fingerprint sensing region by using the touch sensor.

At operation 1520, the electronic device (e.g., the processor 540) may acquire touch information on the display from the touch sensor. According to one embodiment, the touch information may include an X and Y field, a touch major and touch minor field, a size field, a pressure field, an orientation field, and the like.

At operation 1530, the electronic device (e.g., the processor 540) may acquire touch direction and size from touch information.

At operation 1540, the electronic device (e.g., the processor 540) may determine a graphic object, at least based on the touch information, for guiding acquisition of a user's fingerprint corresponding to the touch input through the fingerprint sensing region. The graphic object may be an image or any other type such as text or animation. In case of an image, the graphic object may be a fingerprint-form image or an elliptic image having no fingerprint.

According to one embodiment, the electronic device (e.g., the processor 540) may acquire the size of the touch input from the touch information and, based on the acquired size, and determine the size of the graphic object.

According to one embodiment, the electronic device (e.g., the processor 540) may acquire orientation information of the touch input from the touch information and, based on the acquired orientation information, and determine the orientation of the graphic object.

At operation 1550, the electronic device (e.g., the processor 540) may display the graphic object through the fingerprint sensing region of the display or proximity thereof.

Figure 16:
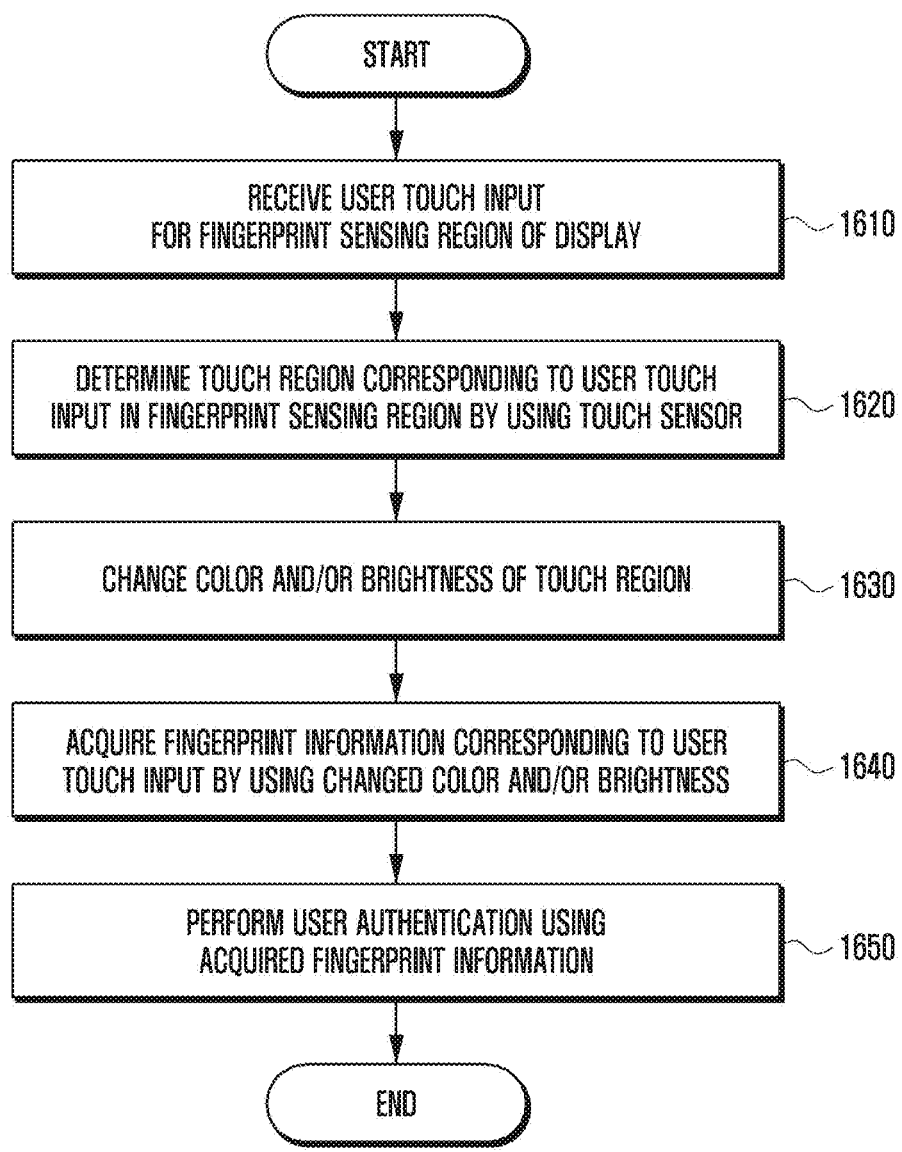
FIG. 16 is a flow diagram illustrating a method for controlling the color and/or brightness of a fingerprint sensing region according to various embodiments of the present disclosure.

FIG. 16 is a flow diagram illustrating a method for controlling the color and/or brightness of a fingerprint sensing region according to various embodiments of the present disclosure.

According to one embodiment, a fingerprint sensor (e.g., 520 of FIG. 5) equipped in the electronic device may be an optical sensor. A processor (e.g., 540 of FIG. 5) may output a certain level of light to the fingerprint sensing region by using a display, and may acquire a fingerprint image through the fingerprint sensor by using the output light.

At operation 1610, the processor of the electronic device may receive a user's touch input for the fingerprint sensing region of the display. The fingerprint sensing region may correspond to a portion of the display under which the fingerprint sensor is formed.

At operation 1620, the processor may determine a touch region corresponding to the user's touch input in the fingerprint sensing region by using a touch sensor (e.g., 530 of FIG. 5). The touch region on the fingerprint sensing region is earlier described with reference to FIG. 9A.

At operation 1630, the processor may control the display to change the color and/or brightness of the touch region. For example, the processor may change the color of the touch region to a suitable color (e.g., green or white) for helping the fingerprint acquisition, and also change the brightness to a certain brightness or more to help the fingerprint acquisition. According to one embodiment, the processor may maintain the color and/or brightness of regions other than the touch region in the fingerprint sensing region.

At operation 1640, the processor may acquire fingerprint information corresponding to the user's touch input through the fingerprint sensor by using the changed color and/or brightness.

At operation 1650, the processor may perform user authentication by using the acquired fingerprint information.

Figure 17:
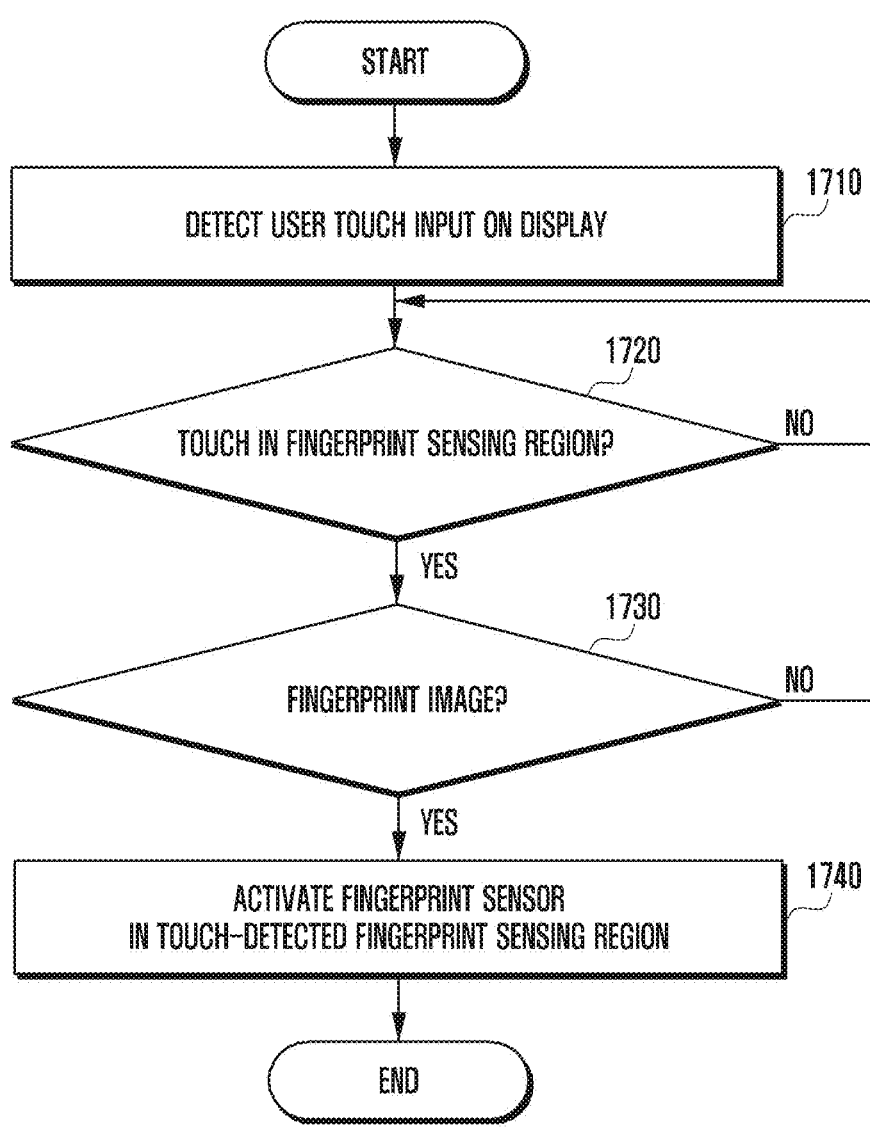
FIG. 17 is a flow diagram illustrating a method for enabling a touch-detected fingerprint sensor according to various embodiments of the present disclosure.

FIG. 17 is a flow diagram illustrating a method for enabling a touch-detected fingerprint sensor according to various embodiments of the present disclosure.

According to one embodiment, when a touch sensor (e.g., 530 of FIG. 5) detects a touch input for a fingerprint sensing region, a processor (e.g., 540 of FIG. 5) of the electronic device may activate a fingerprint sensor (e.g., 520 of FIG. 5).

At operation 1710, the touch sensor may detect a user's touch input on a display. At this operation, all of at least one fingerprint sensor equipped in the electronic device may be in an inactive state.

At operation 1720, the processor may determine whether the detected touch input occurs in the fingerprint sensing region.

At operation 1730, the processor may determine whether the detected touch input is a fingerprint image. According to one embodiment, the processor may identify a touch region and a touch shape, based on sensing values of the touch sensor.

At operation 1740, if the touch input is a fingerprint image, the processor may activate the fingerprint sensor disposed in the fingerprint sensing region where the touch is detected.

According to various embodiments, a method for acquiring a fingerprint at an electronic device having a touch sensor, a fingerprint sensor, a display including a display region having a fingerprint sensing region, and a processor may be provided. The method may be implemented at the processor and may comprise operation of detecting a touch input for the fingerprint sensing region by using the touch sensor, operation of acquiring touch information, corresponding to the touch input, on the display, operation of determining a graphic object for guiding acquisition of a user's fingerprint corresponding to the touch input through the fingerprint sensing region, at least based on the touch information, and operation of displaying the graphic object through the fingerprint sensing region of the display or proximity thereof.

According to various embodiments, the operation of acquiring the touch information may include acquiring a size of the touch input, as the touch information, and the operation of determining the graphic object may include determining a size of the graphic object, based on the acquired size.

According to various embodiments, the operation of acquiring the touch information may include acquiring orientation information of the touch input, as the touch information, and the operation of determining the graphic object may include determining an orientation of the graphic object, based on the acquired orientation information.

According to various embodiments, the method may further comprise operation of determining, as at least part of the touch information, a first region overlapped with the fingerprint sensing region and a second region not overlapped with the fingerprint sensing region in a region touched by the touch input, and operation of determining a position, shape, or size of the graphic object, at least based on the determined first or second region.

According to various embodiments, the method may further comprise operation of determining whether the first region satisfies a specified condition, at least based on a size, position, or shape of the first region, and operation of providing a visual feedback for a touch movement through the display when the first region fails to satisfy the specified condition.

According to various embodiments, the operation of determining whether the first region satisfies a specified condition may include determining that the first region satisfies the specified condition when the size of the first region is larger than or equal to a specified size capable of fingerprint recognition with respect to the fingerprint sensing region.

According to various embodiments, the method may further comprise operation of determining a region overlapped with the fingerprint sensing region in a region touched by the touch input, at least based on the touch information, and operation of changing a color or brightness of the overlapped region.

According to various embodiments, the method may further comprise operation of activating the fingerprint sensor when the touch input for the fingerprint sensing region is detected at the touch sensor.

According to various embodiments, the method may further comprise operation of identifying a position of a hovering touch, and operation of providing a feedback when the position of the hovering touch is not contained in the fingerprint sensing region.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a touch sensor;
a fingerprint sensor;
a display including a display region having a fingerprint sensing region; and
a processor,
wherein the processor is configured to:
  detect a touch input for the fingerprint sensing region using the touch sensor;
  acquire touch information including a size of the touch input, corresponding to the touch input, on the display;
  determine a graphic object for guiding acquisition of a user's fingerprint corresponding to the touch input through the fingerprint sensing region, based at least on the acquired touch information including the size of the touch input; and
  display the graphic object through the fingerprint sensing region of the display or proximity thereof.

2. The electronic device of claim 1, wherein the processor is further configured to:
acquire orientation information of the touch input, as the touch information; and
determine an orientation of the graphic object, based on the acquired orientation information.

3. The electronic device of claim 1, wherein the processor is further configured to:
determine, as at least part of the touch information, a first region overlapped with the fingerprint sensing region and a second region not overlapped with the fingerprint sensing region in a region touched by the touch input; and
determine at least one of a position, shape, or size of the graphic object, based at least on at least one of the determined first or second region.

4. The electronic device of claim 3, wherein the processor is further configured to:
determine whether the first region satisfies a specified condition, based at least on at least one of a size, position, or shape of the first region; and
provide a visual feedback for a touch movement through the display when the first region fails to satisfy the specified condition.

5. The electronic device of claim 4, wherein the processor is further configured to determine that the first region satisfies the specified condition when the size of the first region is larger than or equal to a specified size capable of fingerprint recognition with respect to the fingerprint sensing region.

6. The electronic device of claim 1, wherein the processor is further configured to:

determine a region overlapped with the fingerprint sensing region in a region touched by the touch input, based at least on the touch information; and change at least one of a color or brightness of the overlapped region.

7. The electronic device of claim 1, wherein the processor is further configured to activate the fingerprint sensor when the touch input for the fingerprint sensing region is detected at the touch sensor.

8. The electronic device of claim 1, wherein the processor is further configured to:

determine at least one of a variation in area of the touch input or a pressure of the touch input, based at least on the touch information; and provide a visual feedback through the display when the at least one of the variation in area of the touch input or the pressure of the touch input exceeds a predetermined range.

9. The electronic device of claim 1, wherein the fingerprint sensor is formed at a portion of a back side of the touch sensor.

10. The electronic device of claim 9, wherein the processor is further configured to:

identify a position of a hovering touch; and provide a feedback when the position of the hovering touch is not contained in the fingerprint sensing region.

11. The electronic device of claim 1, wherein the graphic object comprises corrective text when there is a failing in the detecting of the touch input.

12. A method for acquiring a fingerprint at an electronic device having a touch sensor, a fingerprint sensor, a display including a display region having a fingerprint sensing region, and a processor, the method comprising:

detecting a touch input for the fingerprint sensing region by using the touch sensor;

acquiring touch information including a size of the touch input, corresponding to the touch input, on the display;

determining a graphic object for guiding acquisition of a user's fingerprint corresponding to the touch input through the fingerprint sensing region, based at least on the acquired touch information including the size of the touch input; and displaying the graphic object through the fingerprint sensing region of the display or proximity thereof.

13. The method of claim 12, wherein the acquiring of the touch information includes acquiring orientation information of the touch input, as the touch information, and wherein the determining of the graphic object includes determining an orientation of the graphic object, based on the acquired orientation information.

14. The method of claim 12, further comprising:

determining, as at least part of the touch information, a first region overlapped with the fingerprint sensing region and a second region not overlapped with the fingerprint sensing region in a region touched by the touch input; and determining at least one of a position, shape, or size of the graphic object, based at least on at least one of the determined first or second region.

15. The method of claim 14, further comprising:

determining whether the first region satisfies a specified condition, at least based on at least one of a size, position, or shape of the first region; and providing a visual feedback for a touch movement through the display when the first region fails to satisfy the specified condition.

16. The method of claim 15, wherein the determining of whether the first region satisfies a specified condition includes determining that the first region satisfies the specified condition when the size of the first region is larger than or equal to a specified size capable of fingerprint recognition with respect to the fingerprint sensing region.

17. The method of claim 12, further comprising:

determining a region overlapped with the fingerprint sensing region in a region touched by the touch input, based at least on the touch information; and changing at least one of a color or brightness of the overlapped region.

18. The method of claim 12, further comprising:

activating the fingerprint sensor when the touch input for the fingerprint sensing region is detected at the touch sensor.

19. The method of claim 12, further comprising:

identifying a position of a hovering touch; and providing a feedback when the position of the hovering touch is not contained in the fingerprint sensing region.

20. The method of claim 12, wherein the graphic object comprises corrective text when there is a failing in the detecting of the touch input.

* * * * *